US012149504B2

(12) United States Patent
Wu et al.

(10) Patent No.: US 12,149,504 B2
(45) Date of Patent: *Nov. 19, 2024

(54) FIREWALL DRIFT MONITORING AND DETECTION

(71) Applicant: THE BANK OF NEW YORK MELLON, New York, NY (US)

(72) Inventors: Benjamin Wu, New York, NY (US); Sridhar M. Seetharaman, New York, NY (US); Yaroslav Denega, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,786

(22) Filed: Dec. 29, 2023

(65) Prior Publication Data
US 2024/0137341 A1 Apr. 25, 2024

Related U.S. Application Data

(63) Continuation of application No. 17/531,315, filed on Nov. 19, 2021, now Pat. No. 11,936,621.

(51) Int. Cl.
*H04L 9/40* (2022.01)
(52) U.S. Cl.
CPC ...... *H04L 63/0263* (2013.01); *H04L 63/0236* (2013.01); *H04L 63/20* (2013.01)
(58) Field of Classification Search
CPC ............. H04L 63/1433; H04L 63/1441; H04L 63/102; H04L 63/08; H04L 63/1425;
(Continued)

(56) References Cited

U.S. PATENT DOCUMENTS

| 7,254,833 B1* | 8/2007 | Cornelius | H04L 63/0209 726/14 |
| 7,343,619 B2* | 3/2008 | Ofek | H04L 47/193 709/225 |

(Continued)

OTHER PUBLICATIONS

International Preliminary Report on Patentability dated May 2, 2024, issued in corresponding International Application No. PCT/US2022/049674 (6 pgs.).

(Continued)

*Primary Examiner* — Ninos Donabed
(74) *Attorney, Agent, or Firm* — Pillsbury Winthrop Shaw Pittman LLP

(57) ABSTRACT

The present application relates to embodiments for detecting firewall drift. In some embodiments, a first set of firewall rules of a first firewall for a first instance of a distributed application, a second set of firewall rules of a second firewall for a second instance of the distributed application, and a mapping of IP addresses to identifiers of services from amongst a first set of services of the first instance and a second set of services of the second instance may be obtained. First connectivity data and second connectivity data may be generated indicating, for each of IP address associated with the first and second set of firewall rules, a respective port number over which communications between a respective IP address are transmitted, and generating comparison data indicating whether firewall drift is detected based on a comparison of the first connectivity data and the second connectivity data.

20 Claims, 12 Drawing Sheets

(58) Field of Classification Search
CPC . H04L 63/1416; H04L 63/10; H04L 63/0263; H04L 63/0236; H04L 63/20
See application file for complete search history.

(56) References Cited

U.S. PATENT DOCUMENTS

| | | | | |
|---|---|---|---|---|
| 7,441,017 | B2* | 10/2008 | Watson | H04L 45/00 709/215 |
| 7,784,097 | B1* | 8/2010 | Stolfo | H04L 63/1408 709/227 |
| 7,849,507 | B1* | 12/2010 | Bloch | H04L 63/168 726/22 |
| 8,516,241 | B2* | 8/2013 | Chang | H04L 49/70 713/153 |
| 8,893,253 | B2* | 11/2014 | Cianfrocca | H04L 63/02 726/22 |
| 9,231,911 | B2* | 1/2016 | Setia | H04L 63/0227 |
| 9,787,641 | B2* | 10/2017 | Bansal | H04L 63/0263 |
| 9,838,354 | B1* | 12/2017 | Tulasi | H04L 63/20 |
| 10,320,749 | B2* | 6/2019 | Sengupta | H04L 63/0218 |
| 10,484,334 | B1* | 11/2019 | Lee | H04L 67/30 |
| 10,992,678 | B1* | 4/2021 | Gilman | H04L 63/10 |
| 11,075,804 | B2* | 7/2021 | Hume | H04L 41/145 |
| 11,533,307 | B2* | 12/2022 | Mahajan | H04L 61/4511 |
| 11,570,146 | B2* | 1/2023 | Liu | H04L 45/586 |
| 2002/0088898 | A1* | 7/2002 | Lucy | A62C 3/0207 244/17.11 |
| 2005/0015624 | A1* | 1/2005 | Ginter | H04L 63/145 726/4 |
| 2005/0257264 | A1* | 11/2005 | Stolfo | H04L 63/1475 713/188 |
| 2007/0050777 | A1* | 3/2007 | Hutchinson | G06F 11/0781 718/104 |
| 2009/0138960 | A1* | 5/2009 | Felty | G06N 5/025 726/14 |
| 2009/0271504 | A1* | 10/2009 | Ginter | H04L 63/02 709/220 |
| 2014/0068701 | A1 | 3/2014 | Burchfield et al. | |
| 2015/0222598 | A1* | 8/2015 | Koponen | H04L 61/2503 726/13 |
| 2015/0229607 | A1* | 8/2015 | Hwang | H04L 61/2567 726/11 |
| 2015/0358283 | A1* | 12/2015 | Halabi | H04L 63/0227 726/1 |
| 2016/0294772 | A1* | 10/2016 | Padmanabhan | H04L 63/0263 |
| 2017/0187679 | A1* | 6/2017 | Basak | H04L 63/0263 |
| 2018/0054418 | A1* | 2/2018 | El Defrawy | H04L 63/10 |
| 2018/0054419 | A1* | 2/2018 | Shanks | H04L 63/0236 |
| 2018/0063087 | A1* | 3/2018 | Hira | H04L 63/0428 |
| 2018/0115521 | A1 | 4/2018 | Bansal et al. | |
| 2018/0131675 | A1* | 5/2018 | Sengupta | H04L 63/0245 |
| 2018/0145922 | A1* | 5/2018 | Movsisyan | H04L 47/70 |
| 2018/0262447 | A1* | 9/2018 | Nhu | H04L 41/12 |
| 2019/0104022 | A1* | 4/2019 | Power | H04L 67/12 |
| 2019/0303212 | A1* | 10/2019 | Bosch | H04L 67/1097 |
| 2020/0358744 | A1* | 11/2020 | Lee | H04L 63/0236 |
| 2021/0036990 | A1 | 2/2021 | Sengupta et al. | |
| 2021/0314240 | A1* | 10/2021 | Liu | H04L 63/0263 |
| 2021/0314299 | A1* | 10/2021 | Gopal | H04L 63/0263 |
| 2022/0103598 | A1* | 3/2022 | Vaidya | H04L 63/0209 |
| 2022/0191168 | A1* | 6/2022 | Snehashis | H04L 41/22 |
| 2022/0191173 | A1* | 6/2022 | Karpovsky | H04L 63/1433 |
| 2022/0210128 | A1* | 6/2022 | Allam | H04L 63/0263 |
| 2022/0263754 | A1* | 8/2022 | Tracy | H04L 63/0272 |
| 2023/0100322 | A1* | 3/2023 | Mengwasser | G06F 9/547 712/239 |
| 2023/0156038 | A1* | 5/2023 | Konda | H04L 9/0643 713/151 |

OTHER PUBLICATIONS

International Search Report dated Apr. 4, 2023, issued in corresponding International Application No. PCT/US2022/049674 (3 pgs.).

Written Opinion of the International Searching Authority dated Apr. 4, 2023, issued in corresponding International Application No. PCT/US2022/049674 (4 pgs.).

* cited by examiner

Config. Update Subsystem 112

502

| App. | Port # | Drift? | Drift Type |
|---|---|---|---|
| App. X | 3 | Y | Missing |
| App. X | 2 | Y | Unexpected |

602

| Rule Name | Source IP Address | Destination IP Address | Port # |
|---|---|---|---|
| Rule A | 3.4.1 | 1.2.3 | 1 |
| Rule B | 3.4.1 | 1.2.3 | 2 |
| Rule C | 3.4.1 | 1.2.3 | 3 |
| Rule D | 3.4.1 | 1.2.4 | 1 |
| New Rule 1 | 3.4.1 | 1.2.4 | 2 |

604

606

| Rule Name | Source IP Address | Destination IP Address | Port # |
|---|---|---|---|
| 1 Rule | 4.1.2 | 2.3.4 | 1 |
| A Rule | 4.1.2 | 2.3.4 | 2 |
| FW1 | 4.1.2 | 2.4.1 | 1 |
| FW2 | 4.1.2 | 2.4.1 | 2 |
| New Rule 2 | 4.1.2 | 2.4.3 | 3 |

FIREWALL DRIFT MONITORING AND DETECTION

CROSS-REFERENCE TO RELATED APPLICATIONS

This application is a Continuation application of U.S. Ser. No. 17/531,315, filed Nov. 19, 2021, the subject matter of each of which is incorporated herein by reference in its entirety.

BACKGROUND

A firewall is a network security software, device, or a combination thereof, that monitors data traffic to and from one or more client devices. The firewall can allow or prevent data packets to be transmitted to/sent by the computing devices based on one or more sets of rules. The firewall's rules define source addresses allowed to send data packets to particular destination addresses, and a port number of a port over which the data packets can be sent.

In a large network, including multiple firewalls, applications can be set up to maintain redundancy of all the network rules, such as using multiple data centers, servers, or using other techniques. When a data center or server fails, an application can migrate functions to another data center or re-route traffic to another server. However, in order to ensure that service to the application is not disrupted for end users, the firewall rules, as well as other configurations, need to be identical across all firewalls in the network. "Firewall drift" refers to a scenario where the firewall rules are not identical across the network (e.g., one firewall has a different rule or rules than another firewall), and usually is not detected until a failover test is performed or during a real network outage when migration or re-routing is to occur. This becomes increasingly problematic because, in order to resolve the issue, the cause of the firewall drift must be identified and the configuration data for each firewall needs to be updated. Additionally, in the scenario where the firewall drift is only detected during a real network outage, end user service is compromised, diminishing a user's trust in the network and preventing essential services from operating.

SUMMARY

The following is a non-exhaustive listing of some aspects of the present techniques. These and other aspects are described in the following disclosure.

Some aspects include a process that includes: obtaining, with a computing system, a first set of firewall rules of a first firewall for a first instance of a distributed application, the first set of firewall rules specifying whether respective pairs of network sockets of a first set of network sockets are authorized to communicate with one another via network traffic, the first instance of the distributed application comprising a first set of instances of a plurality of processes executing on a first plurality of computers, and wherein each network socket of the first set of network sockets comprises an IP address and a port number of a port specifying one of the first set of instances associated with the network traffic; obtaining, with the computer system, a second set of firewall rules of a second firewall for a second instance of the distributed application, the second set of firewall rules specifying whether respective pairs of network sockets of a second set of network sockets are authorized to communicate with one another via network traffic, the second instance of the distributed application comprising a second set of instances of the plurality of processes executing on a second plurality of computers, and wherein each network socket of the second set of network sockets comprises an IP address and a port number of a port number of a port specifying one of the second set of instances associated with the network traffic; obtaining, with the computer system, a mapping of a plurality of network sockets from amongst the first set of network sockets and the second set of network sockets to identifiers of processes among the plurality of processes, the mapping indicating which processes of the plurality of processes have respective instances from amongst the first set of instances and the second set of instances bound to which network sockets of the plurality of network sockets; determining, with the computer system, based on the mapping, whether the first set of firewall rules prohibit different processes from the plurality of processes from communicating with one another than the second set of firewall rules, the determination comprising: translating network sockets included within the first set of firewall rules and the second set of firewall rules into identifiers of processes from the plurality of processes to obtain a translated first set of rules and a translated second set of rules, and comparing the translated first set of rules and the translated second set of rules; and storing, with the computer system, a result of the determination in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 6 illustrates an example configuration update system for updating configuration data for each firewall in a network based on detected firewall drift, in accordance with various embodiments;

Figure 1:
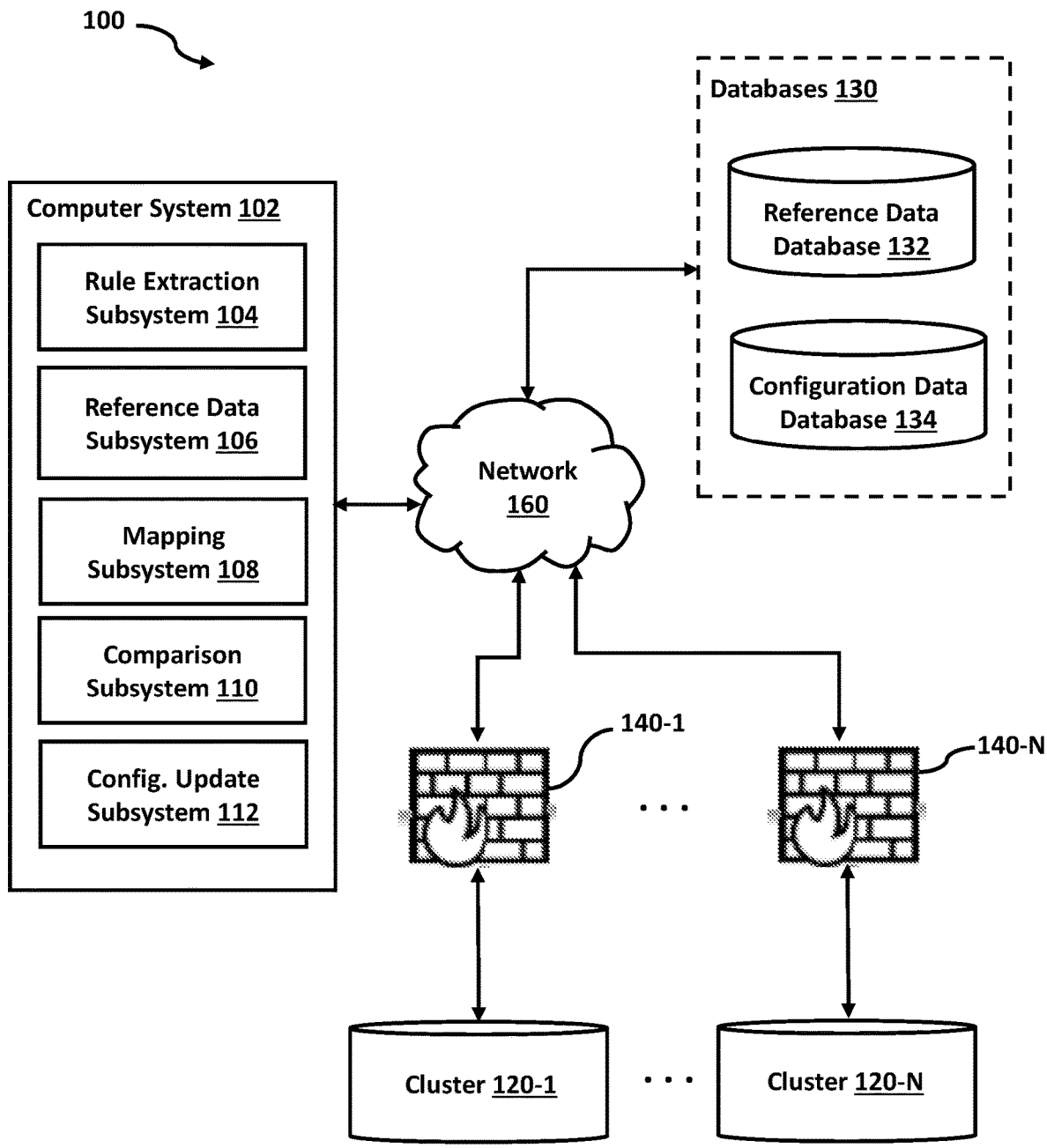
FIG. 1 illustrates an example system for detecting and correcting instances of firewall drift, in accordance with various embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of network/cyber security. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Firewalls are components of computer networks that filter incoming and outgoing traffic. Firewalls store rules that indicate source addresses that are authorized to transmit data packets to certain destination addresses. Such authorization may be distinct from, and does not require, authorization at the application layer, e.g., two processes may be permitted to communicate by a firewall, but one process may still fail to authenticate itself to the other. The rules also may include one or more port numbers indicating one or more ports of the destination addresses whereby the data packets are directed. If a data packet received by the firewall originates from a source address differing from the allowed source addresses stored in the firewall's rules, then that data packet is blocked from transmitting to any devices protected by the firewall. In some cases, the firewall rules do not identify which processes are bound to which network socket, e.g., a rule may specify that one network socket may not communicate with another without identifying the processes bound to those sockets in some cases. A network socket is identified by its socket address, which includes an IP address (source and/or destination), and a port number. In some cases, the socket address also includes a transportation protocol for the communications. Furthermore, the firewall rules may be encrypted using one or more encryption techniques (e.g., RSA). The firewall rules may further include one or more rules for encrypting data packets to be transmitted based on the firewall rule (e.g., the firewall rules may specify a type of encryption to be supported by the processes bound to network sockets).

In some embodiments, an application may be hosted by one or more client devices defined by internet protocol (IP) addresses and ports. An end user may access a service provided by the application over a network via the ports. For example, an end user may submit, via a client device, a request to the application, where the request may include the client device IP address (e.g., a "source address"), the application's IP address (e.g., a "destination address"), and a port number of a port associated with the application's IP address. The firewall governing traffic flow to the application's IP address may store one or more rules that indicate whether the particular source address of the end user's client device is authorized to transmit data packets to the destination address and port number of the application. If the firewall's rules indicate that the source address of the end user's client device is authorized to transmit data packets to the application's destination address and port number, then the request may be allowed to pass through the firewall to the application. If the firewall's rules do not indicate that the source address of the end user's client device is authorized to transmit data packets to the destination address and port number of the application, then the request may be denied.

Large computer networks often can include multiple firewalls, which can each function to protect a cluster of computing nodes, e.g., computers. For example, a computer network formed of one hundred client devices, which are also referred to herein interchangeably as "computing nodes," may be segmented into ten clusters, each cluster including ten client devices. In this example, ten firewalls may be implemented in the computer network, one for each of the ten clusters, to filter incoming and outgoing traffic to a respective cluster. Each of the ten firewalls may include a set of one or more rules, referred to as "firewall rules," that specify what traffic can be received by each of the client devices protected by a corresponding firewall, as well as what traffic can be output from the client devices.

In some embodiments, applications may be set up to maintain redundancy across a number of firewalls of a computer network. In this way, if a computing node, cluster of computing nodes, or other component of the network fails for any reason, the applications can still be accessible via the other computing nodes and clusters in the network. For example, if a first cluster of computing nodes fails, then traffic directed to the first cluster can be re-routed to a second cluster of computing nodes so that operations can continue without impacting end user performance. Some cases include the applications being distributed applications in which some or all of the computers in the cluster execute tasks concurrently to effectuate operations associated with the application, e.g., with different subsets of the computers executing different services that constitute a distributed application. Some distributed applications may have one instance executed by one cluster of computers, while another instance of the distributed application may execute on another cluster of computers. Each instance of the distributed application may be the same or different version of the same application. For example, the code of each instance of the distributed application may not be identical. Furthermore, in some embodiments, some computers included in one cluster may overlap with computers of another cluster. To work efficiently and effectively, each firewall in the computer network needs to be similarly configured. Using the previous example, firewall rules of a first firewall governing traffic to/from the first cluster needs to be identical to firewall rules of a second firewall governing traffic to/from the second cluster. While the specific IP addresses indicated by the firewall rules may differ, the services governed by the firewall rules of each firewall needs to provide equivalent access at an application level across all of the firewalls in the computer network. If this does not occur, it is referred to as "firewall drift."

Detecting firewall drift can be complex due to the large number of firewalls and firewall rules included within a given computer network. Therefore, firewall drift can often go undetected until a failover exercise is performed or a real outage occurs. A failover exercise is a planned event where an application's services are moved from one data center to another. Once moved, tests can be performed to ensure that the application operates as excepted. As the number of firewall rules is often very large, and there are no formal tests that check every rule, the failover tests that are performed may seem successful even though firewall drift may have occurred. While the failover exercise provides a mechanism to detect firewall drift in an advance of a service interruption, it requires manual checks and, as mentioned above, can also result in false negative checks. An outage can occur in two formats: a data center outage or an infrastructure outage. During a data center outage, where a data center including a large number of computing nodes is not accessible (e.g., due to natural disaster, security threat, etc.), firewall drift can be detected based on the inability to properly migrate functionality of an application from the compromised data center's computing nodes to a non-compromised data center. Similarly, an infrastructure outage can occur when a network path becomes unavailable and requests are redirected to another host. Firewall drift can be detected in this example based on the inability to service the requests after the redirection. In both outage scenarios, the detected firewall drift is too late, as service to end users is already affected. Additionally, large computing networks typically have complex firewall configuration tables, and thus it can be challenging to compare firewall configuration files that have differing structures.

In some embodiments, a proactive process for detecting and correctly firewall drift for large computing networks may be performed periodically so as to prevent any service interruptions for end users. This affords a number of technical improvements, such as increasing network resources that would otherwise be used to perform firewall drift exercises and correct firewall drift detected during outages, enhancing network stability and security, providing increasingly uninterrupted service, and identifying problematic application setup and operational issues before impacting performance and hindering user experience. Additionally, by proactively detecting and correcting firewall drift before an outage, costs associated with failed requests can be mitigated.

A common attribute present in all of the firewall rules is a port number for an application. A port is a logical construct where a network connection between a first network resource identifier and a second network resource identifier occurs. Each port has a number—the "port number"—and may be associated with a specific process or service. For example, Hypertext Transfer Protocol (HTTP) messages travel over port 80. As another example, file transfers using the file transfer protocol (FTP) occur over ports 20 and 21. It is understood that additional and/or alternate ports and/or port numbers may be utilized within the scope of this disclosure.

The network resource identifier, also referred to herein interchangeably as a "uniform resource identifier" (URI), refers to a specific logical or physical resource. One example network resource identifier is an internet protocol (IP) address that serves as a host or network interface identifier and location address. When a data packet is received by a firewall, it may include a first network resource identifier (e.g., a first IP address) indicating a source (sender) of the data packet, a second network resource identifier (e.g., a second IP address) indicating a destination (receiver) of the data packet, and a port number of a port with which the data is to transmit over.

In a computing network including a plurality of firewalls, each associated with a separate cluster of computing nodes, each port number accessible by an application in one firewall needs to also be accessible to the same application by the other firewalls. Failure to adhere to this can result in firewall drift, which as mentioned before, can cause significant technical problems for end users (e.g., service disruptions, network failures, decreased confidence in network stability, increased cost to correct errors caused by the firewall drift, etc.). Therefore, the systems, methods, and programming described herein provide a technical solution to the aforementioned technical problem, having a technical effect of proactively detecting and correcting firewall drift prior to failover events (e.g., network outage).

In some embodiments, a first firewall and a second firewall from a computing network may be selected. First configuration data including a first set of firewall rules for the first firewall and second configuration data including a second set of firewall rules for the second firewall may be extracted from the respective firewalls or from a configuration data database. For each rule of the first set of rules, one or more of the port numbers and IP addresses may be extracted from the first configuration data, and the IP addresses may then be mapped to applications, e.g., instances of distributed applications, based on reference data. The reference data may include a listing of one or more IP addresses of the network and the applications with which those IP addresses access. After the mapping, first information including a first list of port numbers accessible by one or more applications may be obtained. A same or similar process may be performed for the second firewall's corresponding second configuration data to obtain second information including a second list of port numbers accessible by one or more application. Based on the first information and the second information, a comparison may be performed to determine (i) whether any ports are accessible for an application via the first firewall while also not being accessible for any applications via the second firewall, and/or (ii) whether any ports are accessible for an application via the second firewall while also not being accessible for any applications via the first firewall. Firewall drift is present if either (i) or (ii) is determined to occur. If so, those applications and ports may be identified and the corresponding ports may be opened for the applications. In response to the ports opening, the first configuration data and the second configuration data may be updated to reflect the newly opened ports for the corresponding applications. For example, a new firewall rule may be generated and added to the existing sets of firewall rules of the first set of firewall rules, the second set of firewall rules, or both.

FIG. 1 illustrates an example system for detecting and correcting instances of firewall drift, in accordance with various embodiments. In some embodiments, system 100 may include computer system 102, clusters 120-1 to 120-N (referred to herein as collectively as "clusters 120" and individually "cluster 120"), firewalls 140-1 to 140-N (referred to herein as collectively as "firewalls 140" and individually "firewall 140"), and databases 130. Computer system 102, firewalls 140, clusters 120, or other components of system 100, may communicate with one another via network 160. Although a single network 160 is illustrated in FIG. 1, it is understood that communication between and amongst components of system 100 may occur via multiple networks according to various embodiments.

Clusters 120 represents clusters of computing nodes. A cluster of computing nodes refers to a collection of client devices (e.g., desktops, laptops, servers, mobile devices, etc.). Each client device may also be referred to herein interchangeably as a "computer," and clusters of computing nodes may be referred to herein interchangeably as clusters of "computers." Some computing nodes may host a plurality of services of a distributed application, e.g., with different services corresponding to different processes bound to different network sockets, in some cases in different virtual machines, unikernels, or containers. In some embodiments, different clusters may each be located at a different physical location (e.g., a first cluster is located at a first geographical location, a second cluster is located at a second geographical location, etc.), however some cases include two or more clusters located at a same or similar physical location. In some embodiments, one or more client devices may connect, via network 160 or via another network, to one of the computing nodes of a given cluster so as to communicate with or perform operations using the computing nodes of that cluster. The computing nodes of a given cluster may communicate with one another using a local network (e.g., an Intranet), or via another communication mechanism, and may communicate with computing nodes of other clusters via network 160 (e.g., the Internet).

In some embodiments, each cluster 120 may be associated with a firewall 140 that is configured to filter incoming and outgoing data traffic to the computing nodes of that cluster. A firewall refers to software running on computing hardware, a hardware appliance running on special purpose hardware, or a virtual appliance running on a virtual host. Thus, firewalls 140 may refer to any of the aforementioned types of firewalls that can be used in a computing network. Firewalls 140 may filter data traffic at an application layer, however other configurations can implement firewalls at other layers (e.g., the transport layer). Each firewall 140 filters network traffic based on a set of rules. The rules define which source addresses are authorized to transmit data packets to which destination addresses, and over what port the data packets may be transmitted. Authorized source and destination addresses may be from a list of allowed addresses, which is also referred to as a list of unblocked addresses. Source and destination addresses that are not authorized may be from a list of blocked addresses. The set of rules may be stored in configuration data of a firewall 140. Each rule may specify, amongst other features, a tuple including: a source address (e.g., an IP address of a source of a data packet), a destination address (e.g., an IP address of a destination of the data packet), and a port number of a port with which the data packet may be communicated over. The rules are also referred to herein interchangeably as "firewall rules."

Computer system 102 may include one or more subsystems, such as a rule extraction subsystem 104, a reference data subsystem 106, a mapping subsystem 108, a comparison subsystem 110, a configuration data update subsystem 112 (also referred to herein interchangeably as "config. update subsystem 112), and/or other subsystems. Computer system 102 may include one or more processors, memory, and communications components for interacting with different aspects of system 100. In some embodiments, computer program instructions may be stored within memory, and upon execution of the computer program instructions by the processors, operations related to some or all of subsystems 104-112 may be effectuated.

Rule extraction subsystem 104 may be configured to select firewalls with which comparisons are to be performed and may extract firewall configuration data and firewall rules from firewalls 140, configuration data database 134, or both. In some embodiments, rule extraction subsystem 104 may select a first firewall (e.g., first firewall 140-1) and a second firewall (e.g., second firewall 140-2). Some embodiments include selecting two or more firewalls, such as a first, second, and third firewall. From the selected firewalls, one may be designated as being the "reference" firewall, while the other (or others) may be designated as a "comparison" firewall. The selection of the firewalls may be random (or pseudo-random), or predefined. For example, rule extraction subsystem 104 may select a specific firewall as a reference firewall, and may select another firewall as a specific comparison firewall. The selection of a particular firewall may be based on, at least in part, a number of computing nodes for which that firewall monitors traffic, a number of security rules stored by that firewall's configuration data, and/or other factors. In some embodiments, the selection of the firewalls for checking for firewall drift may be performed periodically, randomly, pseudo-randomly, in response to a request to perform the firewall drift check, or a combination thereof. For example, a firewall drift check may be performed daily, weekly, monthly, or at other temporal intervals. At an expiration of a given temporal interval, rule extraction subsystem 104 may be configured to select the firewalls and extract their configuration data.

In some embodiments, rule extraction subsystem 104 extracts configuration data including firewall rules, or extracts the firewall rules, from one or more of the selected firewalls. The firewall rules specify whether pairs of network sockets (which may be designated by their socket addresses) of a set of network sockets are authorized to communicate with one another via network traffic. A socket address, for example in the context of the Internet protocol suite, includes a transport protocol, IP address (which may appear in packet headers as a source IP address, destination IP address, both source and destination IP addresses), and a port number (e.g., a 16-bit unsigned number) of a port corresponding to one of a first set of instances of a plurality of processes executing on a first plurality of computers that are associated with the network traffic. In other words, the firewall rules specify which sources are allowed to send data packets to which destinations, and over which ports the data packets may be sent. In some cases, socket addresses may be specified in firewall rules by specifying a range or list of IP addresses, a range or list of port numbers, and a set of transport protocols (or transport protocols may be omitted to specify all transport protocols, which is not to suggest that any other feature may not also be omitted in some embodiments).

Figure 2A:
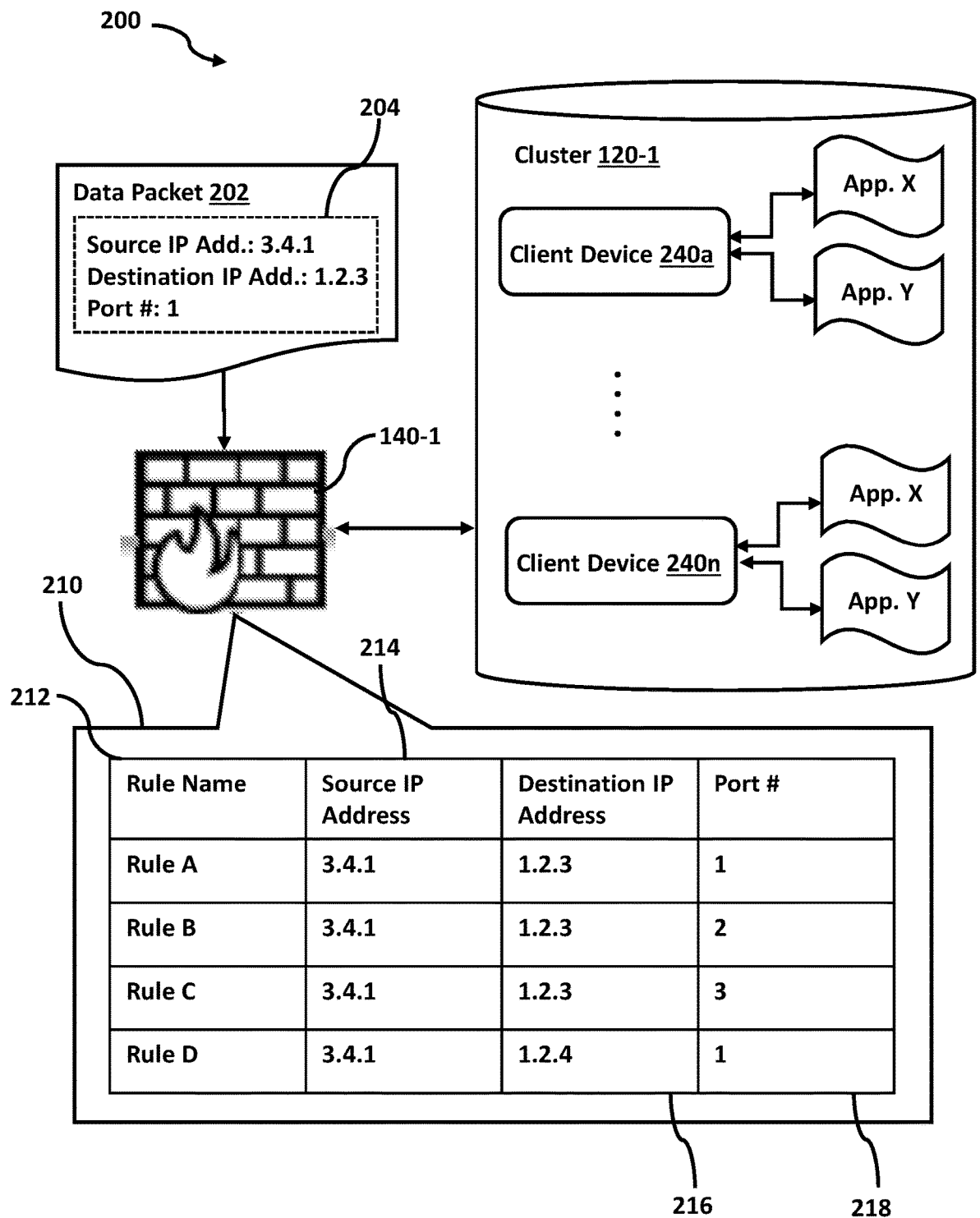
FIGS. 2A and 2B illustrates an example system for identifying a firewall's configuration data for determining whether a data packet is allowed pass to an end client device, in accordance with various embodiments.

As an example, with reference to FIG. 2A, system 200 depicts a data packet 202 which is directed to one of the client devices accessible via first firewall 140-1. Data packet 202 may include a header 204 indicating a source address of a sender of data packet 202 (e.g., source IP address: 3.4.1), a destination address of a recipient of data packet 202 (e.g., destination IP address: 1.2.3), and a port number of a port with which data packet 202 is to communicate over (e.g., port number: 1). Data packet 202 may be received at first firewall 140-1, which may determine whether to allow data packet 202 to pass to one of client devices 240a-240n of first cluster 120-1 based on configuration data 210 including a set of rules (e.g., Rule A, Rule B, Rule C, Rule D). Each of client devices 240a-240n, which may be referred to collectively as "client devices 240" and individually as "client device 240," may host or provide access to one or more services of an application or group of applications. For example, a client device 240 may service requests to a first application, Application X, a second application, Application Y, other applications, or combinations thereof. Additionally or alternatively, each client device 240 may function collectively with some or all of the other client devices in the cluster to allow one or more services of an instance of a distributed application to be performed. As mentioned above, each client device 240 refers to a computer, and first cluster 120-1 may refer to a first plurality of computers.

A service is a capability provided by an application, and a collection of services may be combined to form a distributed application, e.g., one service may be a non-blocking web server, another might be a backend relational database, another might be an in-memory caching database. Services may communicate with one another via various protocols, such as RESTful HTTP (representational state transfer hypertext transport protocol), messaging, GraphQL, and the like. The services described herein may be microservices, which structures an application as a collection of services, and serverless function services. Microservices, for example, are distributed and can use a separate database and model. With microservices, a backend is structures as a cluster of interconnected modular services. In contrast, monolithic applications have all of the logic stored in a same logical codebase. Some distributed applications may be composed of serverless components, like AWS Lambda™ architectures. Serverless function services may be event driven and may use an API for generating events.

Rule extraction subsystem 104 may be configured to extract configuration data 210 associated with first firewall 140-1. In some embodiments, configuration data 210 may be stored in configuration data database 134, however alternatively or additionally, configuration data 210 may be stored by firewall 140-1. In some embodiments, configuration data 210 may be organized as a data structure storing various network security rules. For example, configuration data 210 may include a column 212 indicating a particular security rule's name (e.g., Rule A, Rule B, etc.), a column 214 indicating source IP addresses that are authorized to transmit data packets to specific destination computing nodes monitored by first firewall 140-1, a column 216 indicating destination IP addresses of recipients of data packets from specific source computing nodes, and a column 218 indicating port numbers of ports over which data packets may be transmitted. For example, "Rule A" may indicate that a data packet (e.g., data packet 202) originating from a source IP address 3.4.1 is authorized to be transmitted to a destination IP address 1.2.3 over a port "1." If the data packet includes information (e.g., header 204) satisfying Rule A, then that data packet may be permitted access to cluster 120-1. However, if the data packet does not include information satisfying Rule A, then that data packet may not be permitted to access cluster 120-1. In the latter scenario, the data packet's information may be compared to some or all of the other rules included in configuration data 210 to determine if the data packet may be permitted through firewall 140-1 to cluster 120-1.

Figure 2B:
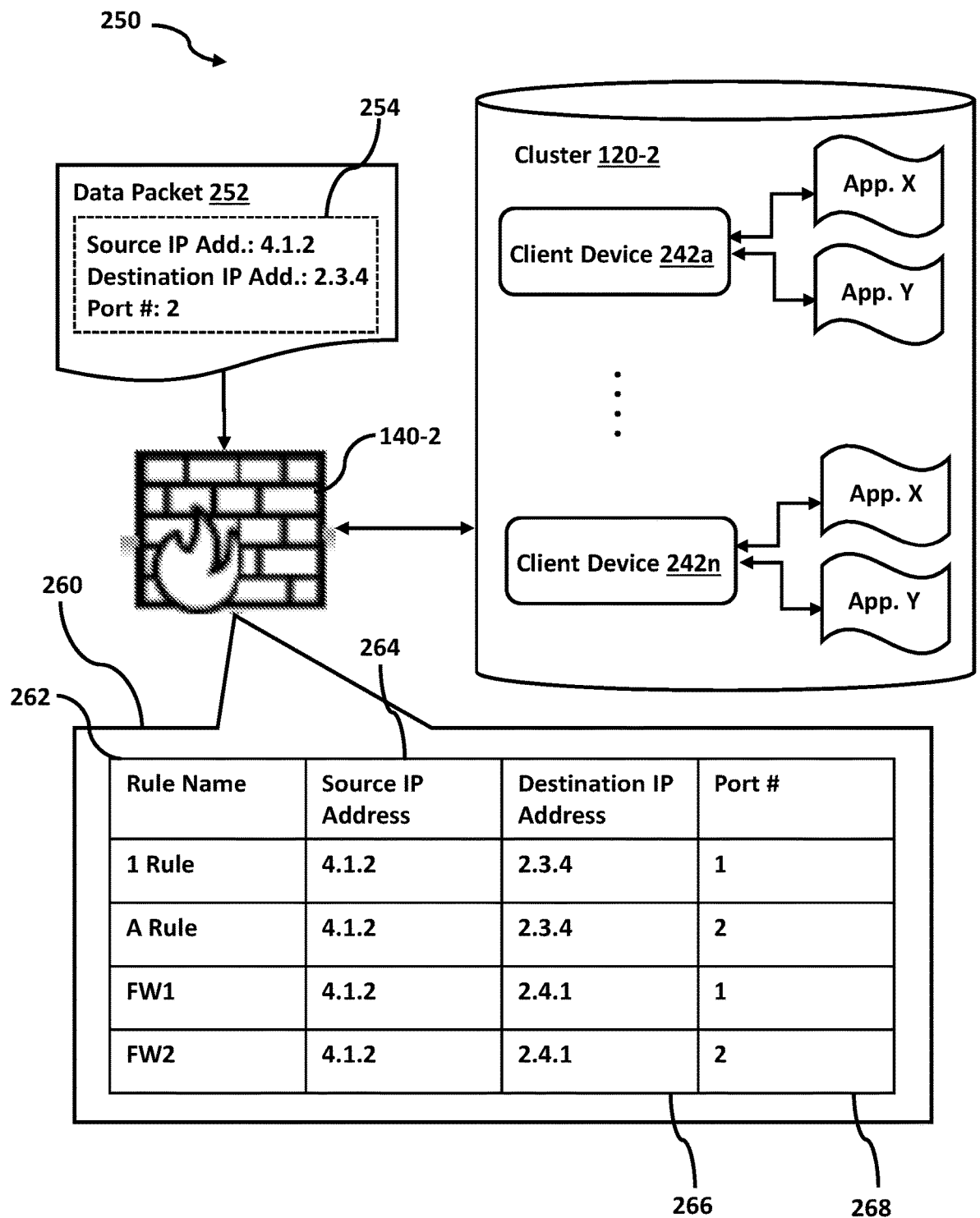

Rule extraction subsystem 104 may also be configured to extract configuration data associated with one or more second firewalls (e.g., a comparison firewall). The configuration data for both the reference firewall and each comparison firewall may be extracted contemporaneously or serially. As an example, with reference to FIG. 2B, rule extraction subsystem 104 may extract configuration data 260 associated with a second firewall 140-2. FIG. 2B includes a system 250 illustrating a data packet 252 which is directed to one of the client devices accessible via second firewall 140-2. Data packet 252 may include a header 254 indicating a source address of a sender of data packet 252 (e.g., source IP address: 4.1.2), a destination address of a recipient of data packet 252 (e.g., destination IP address: 2.3.4), and a port number of a port with which data packet 202 is to communicate over (e.g., port number: 2). Data packet 252 may be received at second firewall 140-2, which may determine whether to allow data packet 252 to pass to one of client devices 242a-242n of second cluster 120-2 based on configuration data 260, including a set of rules (e.g., 1 Rule, A Rule, FW1, FW2). Each of client devices 242a-242n, which may be referred to collectively as "client devices 242" and individually as "client device 242," may host or provide access to one or more services of an application or group of applications. For example, each client device 242 may service requests to first application, Application X, second application, Application Y, other applications, or combinations thereof.

Similar to configuration data 210 of FIG. 2A, configuration data 260 of FIG. 2B may be stored in configuration data database 134, however alternatively or additionally, configuration data 260 may be stored by firewall 140-2. In some embodiments, configuration data 260 may be organized as a data structure storing various network security rules. For example, configuration data 260 may include a column 262 indicating a particular security rule's name (e.g., 1 Rule, A Rule, etc.), a column 264 indicating source IP addresses that are authorized to transmit data packets to specific destination computing nodes monitored by second firewall 140-2, a column 266 indicating destination IP addresses of recipients of data packets from specific source computing nodes, and a column 268 indicating port numbers of ports over which data packets may be transmitted. For example, "A Rule" may indicate that a data packet (e.g., data packet 252) originating from a source IP address 4.1.2 is authorized to be transmitted to a destination IP address 2.3.4 over a port "2." If the data packet includes information (e.g., header 254) satisfying A Rule, then that data packet may be permitted access to cluster 120-2. However, if the data packet does not include information satisfying A Rule, then that data packet may not be permitted to access cluster 120-2. In the latter scenario, the data packet's information may be compared to some or all of the other rules included by configuration data 260 to determine if the data packet may be permitted through firewall 140-2 to cluster 120-2.

Figure 3:
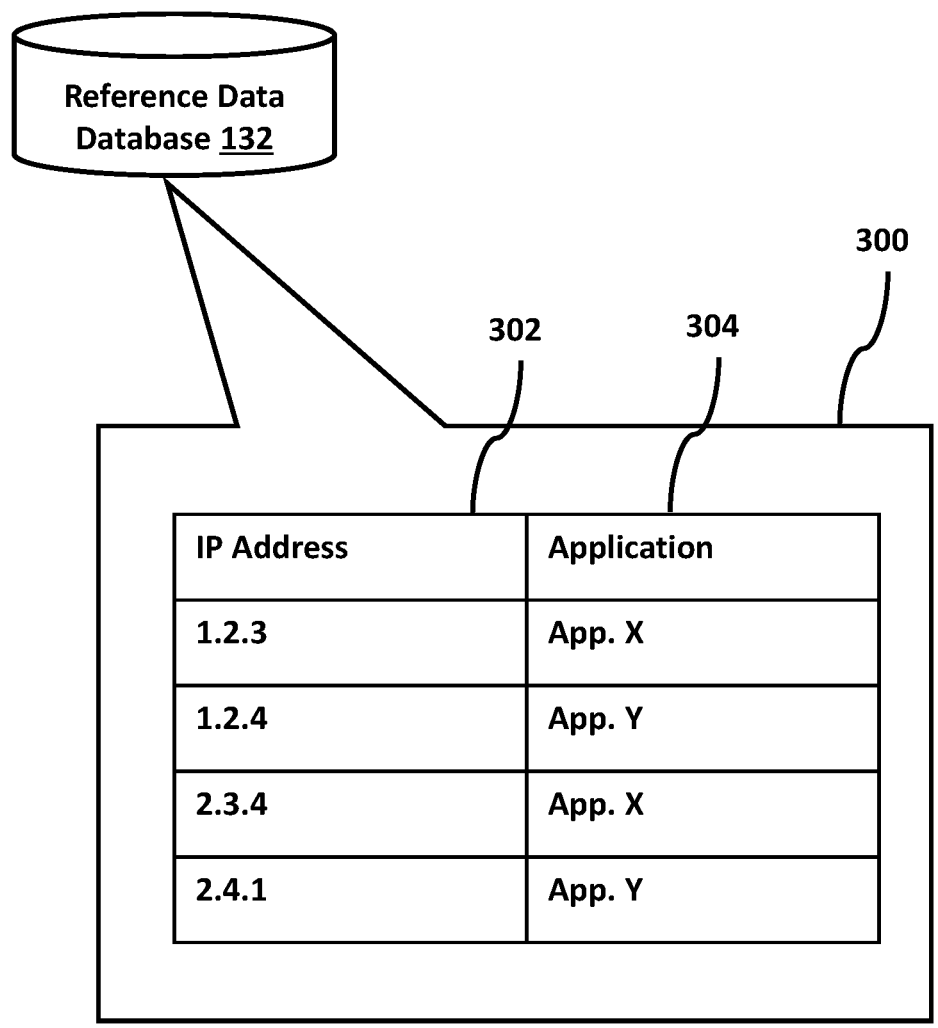
FIG. 3 illustrates example reference data including a mapping of IP addresses to applications, in accordance with various embodiments.

In some embodiments, reference data subsystem 106 may be configured to generate, update, and retrieve reference data including a mapping of IP addresses to applications. The mapping may map or associate a plurality of network sockets from a first set of network sockets (e.g., where a first set of firewall rules extracted for first firewall 140-1 specify whether respective pairs of network sockets from the first set of network sockets are authorized to communicate with each other via network traffic) and a second set of network sockets (e.g., where a second set of firewall rules extracted for second firewall 140-2 specify whether respective pairs of network sockets from the second set of network sockets are authorized to communicate with each other via network traffic) to identifiers of processes from amongst a plurality of processes executing on the computers of first cluster 120-1 and the computers of second cluster 120-2. As an example, with reference to FIG. 3, reference data 300 may be stored in reference data database 132. Reference data 300 may be stored in a data structure including a set of IP addresses, specified by column 302, and a set of applications associated with those IP addresses, specified by column 304. Reference data 300 maps a particular application to an IP address that hosts the application. For example, application "App X" may be hosted by or accessible by IP address 1.2.3 and 2.3.4. In some cases, reference data 300 may also include protocols authorized for each pair of network sockets.

In some embodiments, reference data subsystem 106 may be configured to scan one or more firewalls 140 and extract a list of IP addresses accessible via that firewall 140. For example, reference data subsystem 106 may extract a first list of IP address accessible via first firewall 140-1 and a second list of IP addresses accessible via second firewall 140-2. Reference data subsystem 106 may also be configured to obtain data for one so more application hosted by one or more of client devices 240, 242 of each cluster 120, where the data indicates instances of applications, services of those applications, or both that have been accessed by which IP addresses. In some embodiments, reference data subsystem 106 may link an application or service and an IP address together based on the obtained data and the extracted lists of IP addresses. For example, the first list of IP addresses may indicate that the IP address "1.2.3" is accessible via first firewall 140-1, and the obtained data may indicate that application "App. X" provides one or more services to the IP address "1.2.3." Therefore, reference data subsystem 106 may generate a link between the IP address "1.2.3" and the application "App. X." In some embodiments, reference data subsystem 106 may perform the aforementioned steps periodically, such as daily, weekly, monthly, or at another temporal interval, to generate reference data 300.

The reference data representing the mapping provides an important piece of information for detecting firewall drift in an effective and proactive manner. In particular, translating network sockets to identifiers of processes requires the information included with reference data to associate port numbers with application services. Such information is often user/client specific. Most dev op tools do not correlate the application layer with the network, transport, or session layer in the OSI model. Furthermore, even dev op tools that do correlate these layers are unable to produce the reference data because the systems with which they mapping correlates are heterogenous and often do not communicate with one another.

Figure 4:
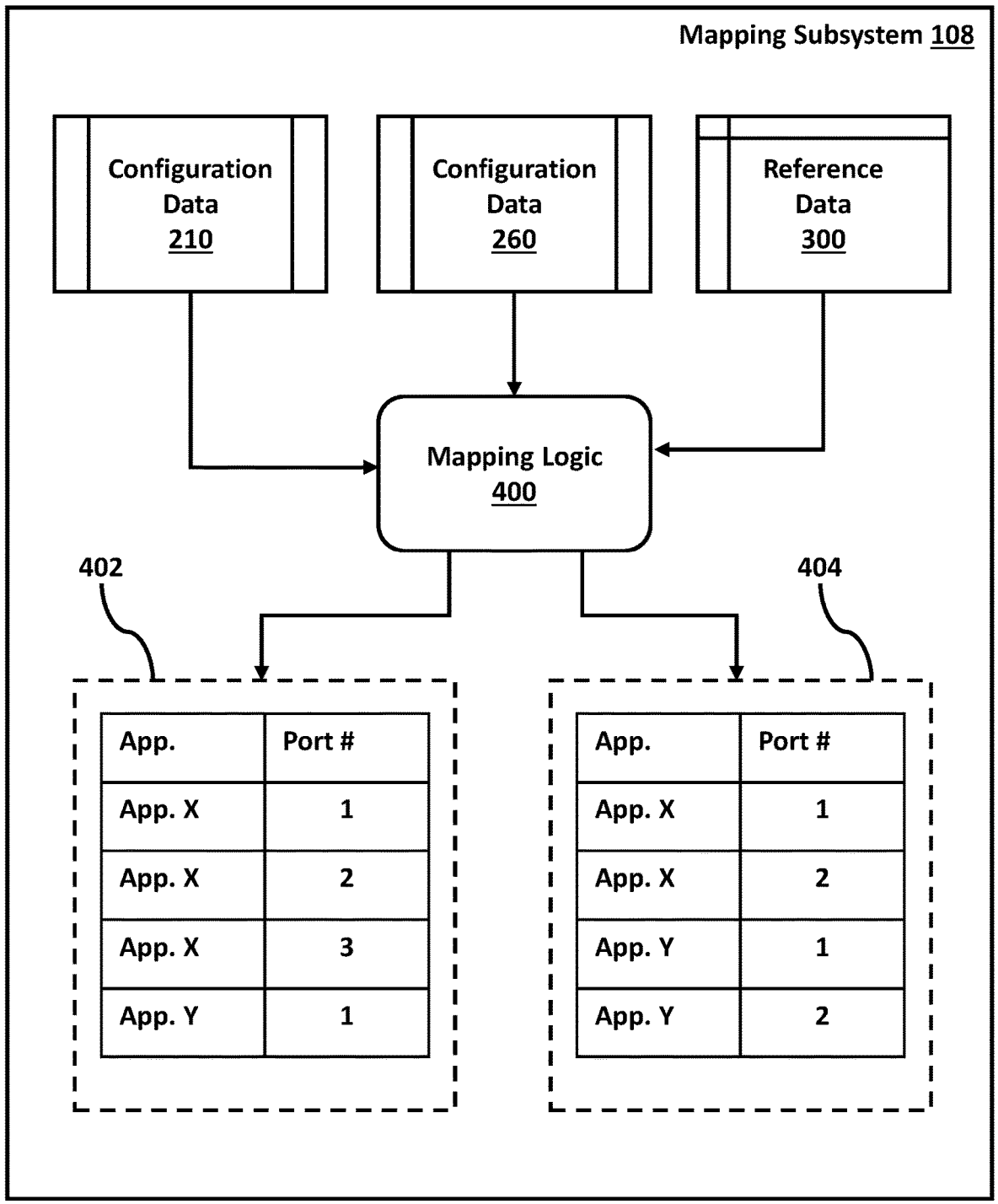
FIG. 4 illustrates an example mapping subsystem for mapping applications operated by client devices associated with a first firewall to port numbers associated with those client devices, in accordance with various embodiments.

In some embodiments, mapping subsystem 108 may be configured to perform a mapping of services, applications, and/or services and applications to port numbers based on the configuration data associated with each firewall (e.g., reference firewall, comparison firewall(s)), and the reference data. As an example, with reference to FIG. 4, mapping subsystem 108 may obtain configuration data 210 from first firewall 140-1 or configuration data database 134, configuration data 260 from second firewall 140-2 or configuration data database 134, and reference data 300 from reference data database 132. In some embodiments, configuration data 210 and configuration data 260 may be obtained in parallel or one after another. Similarly, reference data 300 may be obtained with either configuration data 210 or 260, prior to configuration data 210 or 260 being received by mapping subsystem 108, or after configuration data 210 or 260 is received by mapping subsystem 108.

In some embodiments, mapping subsystem 108 includes mapping logic 400, which takes, as input, configuration data 210 and 260 (or firewall rules) and reference data 300. Using configuration data 210, 260 and reference data 300, mapping logic 400 maps an application or services of an instance of the application, to a corresponding port with which communications related to that application may be transmitted. As an example, Rule A from configuration data 210 includes destination IP address 1.2.3 and port number "1." Reference data 300 indicates that the IP address 1.2.3 is associated with application "App X." Therefore, mapping logic can derive that application "App X" is associated with port number "1." As another example, Rule C from configuration data 210 includes destination IP address 1.2.3 and port number "3." As previously mentioned, reference data 300 indicates that IP address 1.2.3 is associated with application "App X," and therefore mapping logic may determine that application "App X" is also associated with port number "3." In some embodiments, mapping logic 400 may iteratively analyze each rule included in configuration data 210 and determine, for a given rule, a mapping between an application and a port number with which data associated with the application transmits over. Similarly, mapping logic may iteratively analyze each rule included in configuration data 260 and determine, for a given rule, a mapping between an application and a port number associated with which data associated with the application transmits over. In some embodiments, mapping logic 400 may analyze configuration data 210 and configuration data 260 against reference data 300 in parallel, however configuration data 210 and 260 may alternatively be analyzed against reference data 300 sequentially.

In some embodiments, mapping logic 400 is configured to output first information 402, which includes a listing of applications accessible via first firewall 140-1 and port numbers associated with those applications. For example, first information 402 indicates that, for first firewall 140-1, application "App X" is associated with port numbers "1," "2," and "3," and application "App Y" is associated with port number "1." In some embodiments, mapping logic 400 is configured to output second information 404, which includes a listing of applications accessible via second firewall 140-2 and port numbers associated with those applications. For example, second information 404 indicates that, for second firewall 140-2, application "App X" is associated with port numbers "1" and "2," and application "App Y," is associated with port numbers "1" and "2."

In some embodiments, mapping logic 400 may be configured to translate network sockets (e.g., their socket addresses) included within the first set of firewall rules (e.g., from first configuration data 210) and the second set of firewall rules (e.g., from second configuration data 260) into identifiers of processes from a plurality of processes of the first or second instance of the distributed application executing on the first or second plurality of computers. Mapping logic 400 may output the translated first set of firewall rules and a second set of firewall rules that indicates which application, instance of a distributed application, or service, is authorized to communicate over which port. For example, first information 402 may represent a first translated set of firewall rules, and second information 404 may represent a second set of translated firewall rules.

Figure 5:
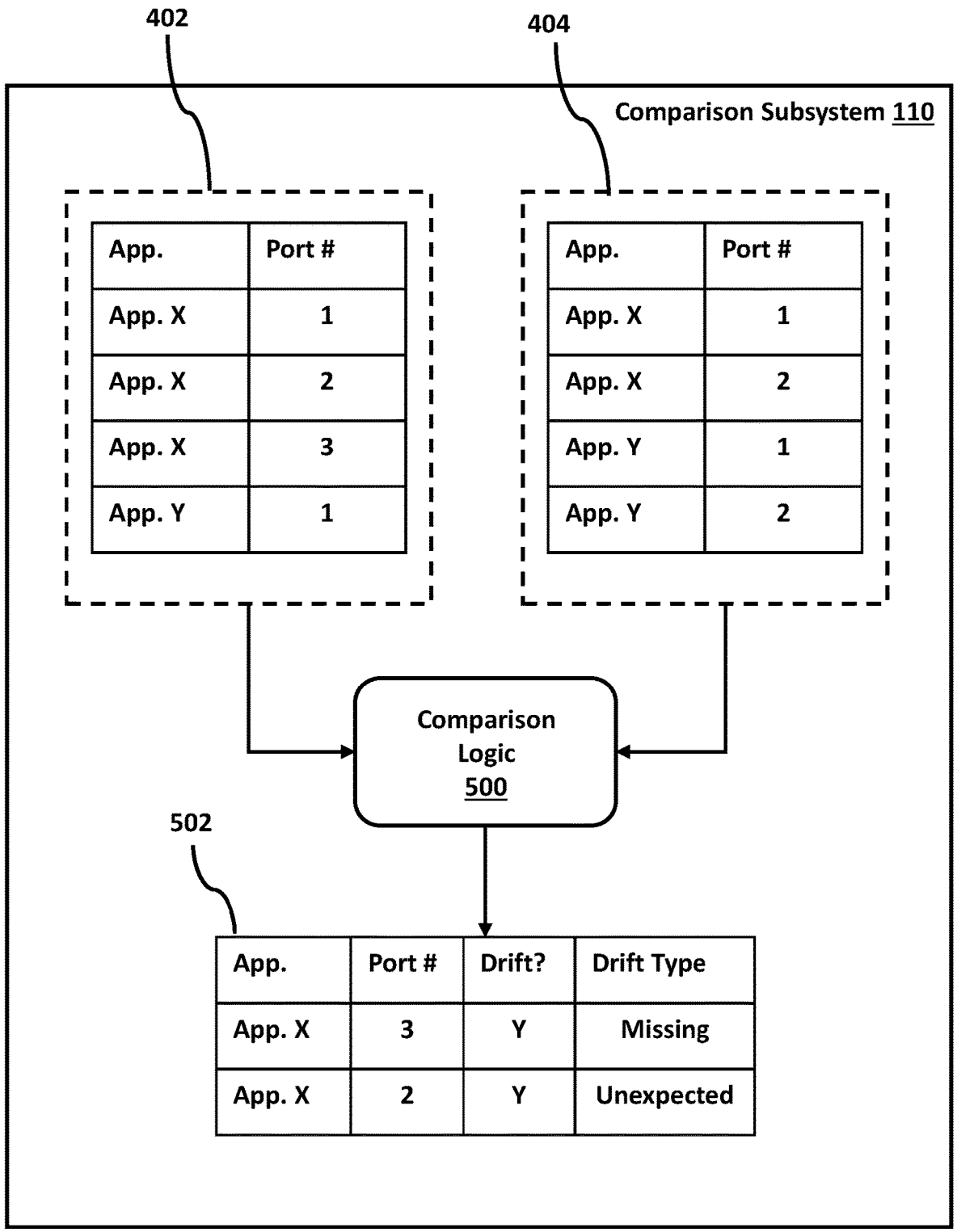
FIG. 5 illustrates an example comparison subsystem for determining whether firewall drift is present, in accordance with various embodiments.

In some embodiments, comparison subsystem 110 may be configured to compare the first information and the second information generated by mapping subsystem 108 (e.g., the translated first set of firewall rules, the translated second set of firewall rules) in order to determine whether the first set of firewall rules of first firewall 140-1 and/or the second set of firewall rules of second firewall 140-2 include any instances of firewall drift. Firewall drift may be detected when the first set of firewall rules prohibit different processes (e.g., processes of an instance of a distributed application executing on a cluster of computers) from communicating with one another than the second set of firewall rules. Thus, comparison subsystem 110 may compare the translated first set of firewall rules and the translated second set of firewall rules to determine whether firewall drift is present. As an example, with reference to FIG. 5, comparison subsystem 110 may obtain first information 402, which includes a mapping of applications accessible via first firewall 140-1 to port numbers of ports with which data may be transmitted to computing nodes monitored by first firewall 140-1, and second information 404, which includes a mapping of applications accessible via second firewall 140-2 to port numbers of ports with which data may be transmitted to computing nodes monitored by second firewall 140-2. Comparison subsystem 110 may include comparison logic 500, which may perform a comparison of first information 402 and second information 404.

In some embodiments, comparison logic 500 may determine whether at least two firewall drift conditions are satisfied. A first firewall drift condition includes comparison logic 500 determining whether one of the first port numbers included in first information 402 is accessible for one or more first applications (e.g., applications running in first cluster 120-1 monitored by first firewall 140-1), but is not accessible for any second applications (e.g., applications running in second cluster 120-2 monitored by second firewall 140-2) based on second information 404. Comparison logic 500 may determine that the first firewall drift condition has been satisfied in response to detecting that an application communicates over a particular port in first cluster 120-1 associated with first firewall 140-1, but that application does not communicate over the port in second cluster 120-2 associated with second firewall 140-2. As an example, application "App. X" running on first cluster 120-1 can communicate over port number "3," however on second cluster 120-2, application "App. X" is not able to communicate over port number "3." The first firewall drift condition being satisfied refers to a firewall drift type "missing." In other words, the port number is "missing" (i.e., not open) for a given application on one cluster (e.g., the comparison firewall's cluster), but is not missing for the application on another cluster (e.g., the reference firewall's cluster).

A second firewall drift condition includes comparison logic 500 determining whether one of the second port numbers included in second information 404 is accessible for one or more first applications (e.g., applications running in second cluster 120-2 monitored by second firewall 140-2), but is not accessible for any first applications (e.g., applications running in first cluster 120-1 monitored by first firewall 140-1) based on first information 402. Comparison logic 500 may determine that the second firewall drift condition has been satisfied in response to detecting that an application communicates over a particular port in second cluster 120-2 associated with second firewall 140-2, but that application does not communicate over the port in first cluster 120-1 associated with first firewall 140-1. As an example, application "App. Y" running on second cluster 120-2 can communicate over port number "2," however on first cluster 120-1, application "App. Y" does not communicate over port number "2." The second firewall drift condition being satisfied refers to a firewall drift type "unexpected." In other words, it is unexpected that an application on one cluster (e.g., a reference firewall's cluster) does not communicate over a particular port, but the application does communicate over that particular port on another cluster (e.g., a comparison firewall's cluster). It is understood that different or alternative types of firewall drift conditions may be used within the scope of this disclosure.

In some embodiments, comparison logic may generate comparison data 502, which includes a list of applications and port numbers for which firewall drift has been detected. Additionally, comparison data 502 may include an indication of a type of firewall drift (e.g., missing, unexpected) that has been detected by comparison logic 500. As an example, comparison data 502 includes two rows: a first row indicating that the firewall rules included in configuration data 260 does not include a rule allowing application "App. X" to communicate over port number "3," and a second row indicating that the firewall rules included in configuration data 210 does not include a rule allowing application "App. Y" to communicate over port number "2."

In some embodiments, one or more firewall in the network may have its configuration data compared to another firewall's configuration data. For example, the configuration data for a first firewall (e.g., configuration data 210 of first firewall 140-1) may be compared to the configuration data for each of other firewalls (e.g., firewalls 140-2 to 140-N). In some embodiments, comparison subsystem 110 may generate a first set of comparison data representing the results of the comparison of the first firewall's configuration data to each other firewalls' configuration data. Similarly, the second firewall's configuration data (e.g., configuration data 260 of second firewall 140-2) may be compared to the configuration data of each other firewalls (e.g., firewalls 140-1, 140-3-140-N). Comparison subsystem 110 may generate a second set of comparison data representing the results of the comparison of the second firewall's configuration data to each other firewalls' configuration data. Some embodiments include comparison subsystem 110 generating N sets of comparison data, each associated with a comparison of one firewall's configuration data to each other firewalls' configuration data.

In some embodiments, configuration data update subsystem 112 may be configured to obtain comparison data 502 from comparison subsystem 110 and facilitate an update to some or all of the configuration data. As an example, with reference to FIG. 6, configuration data update subsystem 112 may obtain comparison data 502 from comparison subsystem 110. Although comparison data 502 represents detected firewall drift based on a comparison between configuration data of two firewalls (e.g., first firewall 140-1 and second firewall 140-2), comparison data 502 may include detected firewall drifts based on a comparison between the configuration data of all of the firewalls in the computing network (e.g., firewalls 140-1 to 140-N). In some embodiments, configuration data update subsystem 112 may generate a data flag for each detected instance of firewall drift. The data flag may be metadata assigned to configuration data with which firewall drift was detected. For example, a data flag may be assigned and stored with configuration data 260 indicating that an instance of firewall drift (e.g., port number "3" missing for application "App. X") has been detected.

In response to the data flag being generated indicating the presence of firewall drift for particular configuration data, configuration data update subsystem 112 may generate a request to resolve the firewall drift. In some embodiments, the request may be for a particular port number to be opened for a particular application. For example, in the example of configuration data 260, where application "App. X" is determined to have port number "3" missing, the request generated by configuration data update subsystem 112 may be to open port number "3" for application "App. X" for second cluster 120-2.

In some embodiments, resolving the firewall drift may include updating a firewall's configuration data by generating and adding a new firewall rule to the existing set of firewall rules included with the firewall's configuration data. For example, configuration data update subsystem 112 may, in response to the request, generate a new rule 604 that authorizes application "App. Y" to communicate over port number "2" on first firewall 140-1. As another example, configuration data update subsystem 112 may, in response to the request, generate a new rule 608 that authorizes application "App. X" to communicate over port number "3" on second firewall 140-2. New rule 604 may be added to second configuration data 260 to obtain updated second configuration data 606. Updated configuration data 602 and 606 may then be stored in configuration data database 134 for future analysis by computer system 102.

In some embodiments, configuration data update subsystem 112 may generate a single instance of configuration data that includes all of the previously existing firewall rules and any newly generated firewall rules. For example, configuration data may be generated that includes a combination of the firewall rules from updated first configuration data 602 and updated second configuration data 606.

In some embodiments, updated configuration data (e.g., updated configuration data 602, 606) may be stored in configuration data database 134 with a timestamp indicating when that configuration data was last updated. This can allow computer system 102 to determine which configuration data to analyze, such as by obtaining a most recently updated version of the configuration data.

Example Flowcharts

FIGS. 7A-7C and 8 illustrate an example process for determining whether a network's firewalls include any instances of firewall drift and, if so, correcting the firewall drift, in accordance with various embodiments. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more computing systems, as described in greater detail below with reference to FIG. 9, one or more processing devices (e.g., a digital processor, an analog processor, a digital circuit designed to process information, an analog circuit designed to process information, a state machine, and/or other mechanisms for electronically processing information), or a combination thereof. The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 7A:
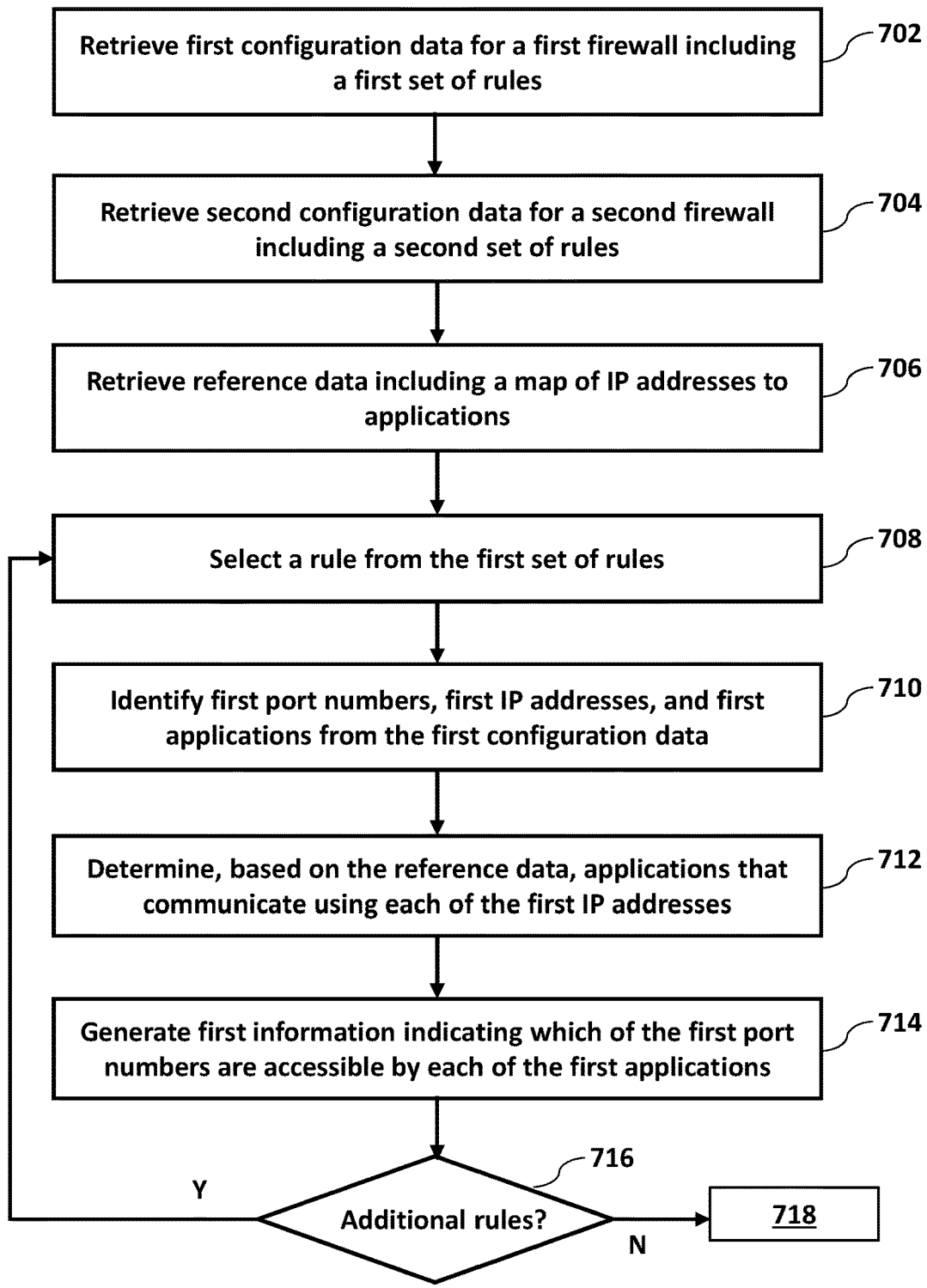
FIGS. 7A-7C illustrate an example process for determining whether a network's firewalls include any instances of firewall drift and, if so, correcting the firewall drift, in accordance with various embodiments.
Figure 7B:
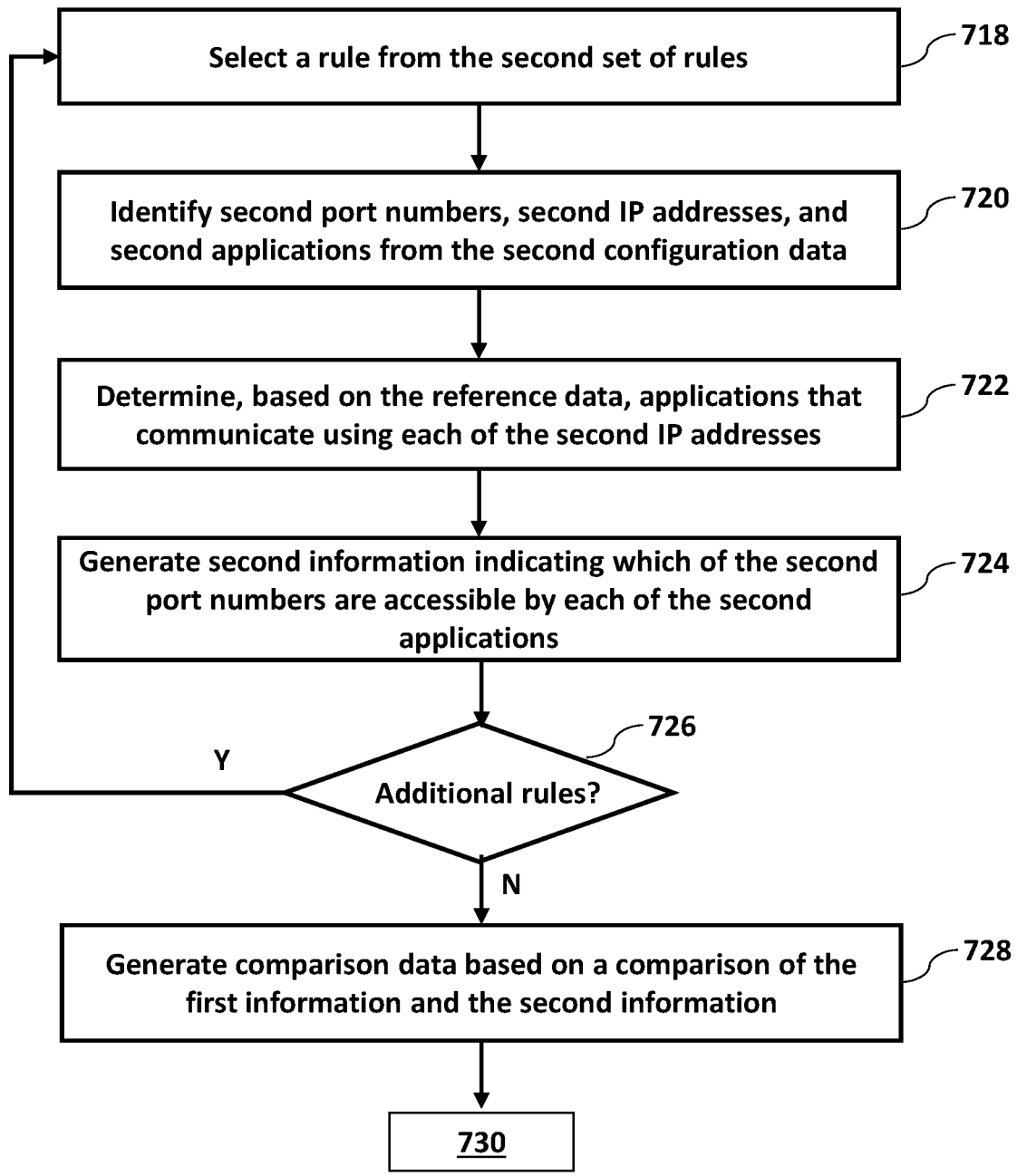
Figure 7C:
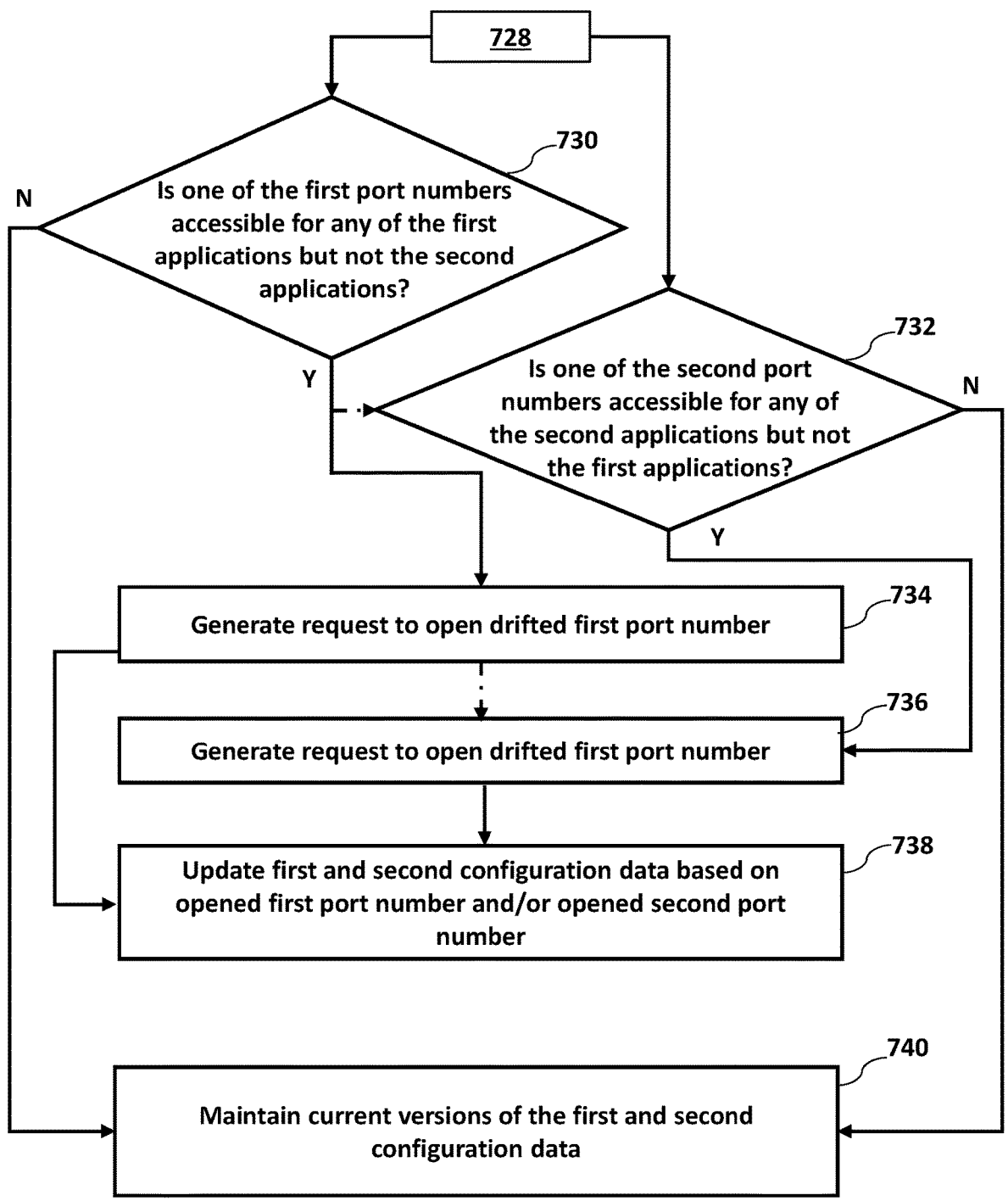

FIGS. 7A-7C illustrate an example method for determining whether a network's firewalls include any instances of firewall drift and, if so, correcting the firewall drift, in accordance with various embodiments. In some embodiments, process 700 may begin at operation 702. In operation 702, first configuration data for a first firewall may be retrieved. For example, first configuration data 210 for first firewall 140-1 may be retrieved from configuration data database 134, first firewall 140-1, or from another source. In some embodiments, the first firewall may be referred to as a reference firewall or a reference node. First configuration data 210 may include a set of firewall rules defining what data can pass through first firewall 140-1 to/from first cluster 120-1. Each rule may include a source IP address, a destination IP address, and a port number of a port with which data is to communicate over. For example, "Rule A" from first configuration data 210 specifies that data packets sent from a source IP address "3.4.1" that are directed to a destination IP address "1.2.3" are permitted to transmit over port number "1." As another example, "Rule B" from first configuration data 210 specifies that data packets sent from a source IP address "3.4.1" that are directed to a destination IP address "1.2.3" are also permitted to transmit over port number "2." In some embodiments, operation 702 may be performed by a subsystem that is the same or similar to rule extraction subsystem 104.

In operation 704, second configuration data for a second firewall may be retrieved. For example, second configuration data 260 for second firewall 140-2 may be retrieved from configuration data database 134, second firewall 140-2, or from another source. In some embodiments, the second firewall may be referred to as a comparison firewall or a comparison node. Second configuration data 260 may include a set of firewall rules defining what data can pass through second firewall 140-2 to/from second cluster 120-2. Each rule may include a source IP address, a destination IP address, and a port number of a port with which data is to communicate over. For example, "FW1" from second configuration data 260 specifies that data packets sent from a source IP address "4.1.2" that are directed to a destination IP address "2.4.1" are permitted to transmit over port number "1." As another example, "FW2" from second configuration data 260 specifies that data packets sent from a source IP address "4.1.2" that are directed to a destination IP address "2.4.1" are also permitted to transmit over port number "2." In some embodiments, operation 704 may be performed by a subsystem that is the same or similar to rule extraction subsystem 104.

In operation 706, reference data including a map of IP addresses to applications may be retrieved. Reference data 300 may be retrieved from reference data database 132. Reference data 300 may include a list of IP addresses operating in each firewalls environment and which applications are hosted/accessible by those IP addresses. For example, reference data 300 indicates that application "App. X" is accessible (e.g., hosted by) IP address "1.2.3" and IP address "2.3.4," and application "App. Y" is accessible (e.g., hosted by) IP address "1.2.4" and IP address "2.4.1." In some embodiments, reference data 300 may be generated by running a scan of all of the IP addresses operating within a given firewall's environment. Then, after the IP addresses have been collected, a determination may be made as to which services, micro-services, collection of services, collection of micro-services, or a combination thereof, are hosted/accessible by each of the IP addresses. The associations between each IP address and one or more applications may then be stored in reference data 300. In some embodiments, reference data 300 may be updated periodically (e.g., daily, weekly, monthly, etc.), in response to a request at the firewall, or both. In some embodiments, operation 706 may be performed by a subsystem that is the same or similar to reference data subsystem 106.

In operation 708, a rule from the first set of rules extracted from the first configuration data may be selected. The rule may selected randomly or pseudo-randomly from the first set of rules or a first rule from the first set of rules may be selected. As an example, "Rule A" may be selected from the first set of rules (e.g., "Rule A," "Rule B," "Rule C," "Rule D") included within first configuration data 210. In some embodiments, operation 708 may be performed by a subsystem that is the same or similar to mapping subsystem 108.

In operation 710, a first IP address (e.g., a destination IP address) and a first port number specified by the selected rule. For example, if the selected rule is "Rule A," the IP address "1.2.3" and the port number "1" may be identified from first configuration data 210. Some embodiments include identifying the source IP address specified by the selected rule. The identified IP address(es) and port number may then be extracted from first configuration data 210. In some embodiments, operation 710 may be performed by a subsystem that is the same or similar to mapping subsystem 108.

In operation 712, one or more applications that communicate using the (selected) first IP address may be determined based on the reference data. For example, based on reference data 300, it can be determined that application "App. X" is hosted by/accessible via first IP address "1.2.3," which was extracted from "Rule A" of first configuration data 210. In some embodiments, operation 712 may be performed by a subsystem that is the same or similar to mapping subsystem 108.

In operation 714, a determination may be made as to whether the set of rules with which the selected rule was selected from includes any additional rules. If so, process 700 may return to operation 708, where another rule is selected from the first set of rules. If, however, at operation 714, it is determined that all of the rules included within the first set of rules from first configuration data 210 have been analyzed (e.g., operations 710-712), then process 700 may proceed to operation 716. In some embodiments, operation 714 may be performed by a subsystem that is the same or similar to mapping subsystem 108.

In operation 716, first information indicating which of the first port number are accessible by each of the first applications may be generated. For example, first information 402 may indicate that application "App. X" is accessible via first firewall 140-1 over port numbers "1," "2," and "3," and application "App. Y" is accessible via first firewall 140-1 over port number "1." In some embodiments, operation 716 may be performed by a subsystem that is the same or similar to mapping subsystem 108.

In operation 718, a rule from the second set of rules extracted from the second configuration data may be selected. The rule may selected randomly or pseudo-randomly from the second set of rules or a first rule from the second set of rules may be selected. As an example, "1 Rule" may be selected from the first set of rules (e.g., "Rule 1," "A Rule," "FW1," "FW2") included within second configuration data 260. In some embodiments, operation 718 may be performed by a subsystem that is the same or similar to mapping subsystem 108.

In operation 720, a first IP address (e.g., a destination IP address) and a second port number specified by the selected rule. For example, if the selected rule is "1 Rule," the IP address "2.3.4" and the port number "1" may be identified from second configuration data 260. Some embodiments include identifying the source IP address specified by the selected rule. The identified IP address(es) and port number may then be extracted from second configuration data 260. In some embodiments, operation 720 may be performed by a subsystem that is the same or similar to mapping subsystem 108.

In operation 722, one or more applications that communicate using the (selected) second IP address may be determined based on the reference data. For example, based on reference data 300, it can be determined that application "App. X" is hosted by/accessible via first IP address "2.3.4," which was extracted from "1 Rule" of second configuration data 260. In some embodiments, operation 722 may be performed by a subsystem that is the same or similar to mapping subsystem 108.

In operation 724, a determination may be made as to whether the set of rules with which the selected rule was selected from includes any additional rules. If so, process 700 may return to operation 718, where another rule is selected from the second set of rules. If, however, at operation 724, it is determined that all of the rules included within the first set of rules from second configuration data 260 have been analyzed (e.g., operations 720-722), then process 700 may proceed to operation 724. In some embodiments, operation 724 may be performed by a subsystem that is the same or similar to mapping subsystem 108.

In operation 726, second information indicating which of the second port number are accessible by each of the second applications may be generated. For example, second information 404 may indicate that application "App. X" is accessible via second firewall 140-2 over port numbers "1" and "2," and application "App. Y" is accessible via first firewall 140-1 over port numbers "1" and "2." In some embodiments, operation 726 may be performed by a subsystem that is the same or similar to mapping subsystem 108.

In operation 728, comparison data may be generated based on a comparison of the first information and the second information. For example, comparison data 502 may be generated based on first information 402 and second information 404. Comparison data 502 includes any detected firewall drift present within the analyzed firewalls' configuration data. Comparison data 502 may indicate whether any applications hosted by one of the IP addresses of first firewall 140-1 communicate over a port that is not open for that application by one of the IP addresses of second firewall 140-2. For instance, comparison data 502 indicates that, on firewall 140-1, application "App. X" can communicate over port number "3," but port number "3" is not open for application "App. X" to communicate over on second firewall 140-2. This type of firewall drift is referred to as "missing." Comparison data 502 may also indicate that, on firewall 140-2, application "App. Y" can communicate over port number "2," but port number "2" is not open for application "App. Y" to communicate over on first firewall 140-1. In some embodiments, operation 728 may be performed by a subsystem that is the same or similar to comparison subsystem 110.

In some embodiments, after the comparison data has been generated for a first firewall and a second firewall, another firewall may be selected and operations 702-728 may be repeated. For example, if first firewall 140-1 and second firewall 140-2 are initially analyzed, then, after operations 702-728 have been performed, a third firewall may be selected and compared to first firewall 140-1. In some embodiments, each of operations 702-728 may be compared for each of the N firewalls included in system 100. In some embodiments, redundant comparisons may be skipped to avoid extraneous resource usage.

In operation 730, a determination may be made as to whether one of the first port numbers is accessible for any of the first applications, but is not accessible for any of the second applications. In operation 732, a determination may be made as to whether one of the second port numbers is accessible for any of the second applications but not any of the first applications. In some embodiments, operations 730 and 732 may be performed in parallel or sequentially. For example, operation 730 may be performed and, after the determination is made, process 700 may proceed to operation 732, or vice versa. In some embodiments, operations 730 and 732 may be performed by a subsystem that is the same or similar to comparison subsystem 110.

If, at one or both of operations 730 and 732, it is determined that all of the first port numbers with which each of the first applications is accessible via first firewall 140-1 are also accessible by the corresponding application via second firewall 140-2, and that all of the second port numbers with which each of the second applications is accessible via second firewall 140-2 are also accessible by the corresponding application via first firewall 140-1, then process 700 may proceed to operation 740. In operation 740, current version of the first and second configuration data may be maintained. For instance, this may indicate that first configuration data 210 and second configuration data 260 are up-to-date, and there is no firewall drift present. In some embodiments, operation 740 may be performed by a subsystem that is the same or similar to comparison subsystem 110.

If, at one or both of operations 730 and 732, the conditions of those operations are satisfied, then process 700 may proceed to operation 734. At operation 734, a request to open each drifted first port number may be generated, and at operation 736, a request to open each drifted second port number may be generated. In some embodiments, a data flag may be generated for each detected firewall drift, and the data flag may be assigned to the corresponding configuration data. In response to the data flag being generated, a request to open a port for a particular firewall may be generated. In some embodiments, operations 734 and 736 may be performed by a subsystem that is the same or similar to configuration data update subsystem 112.

In operation 738, the first and second configuration data may be updated based on the opened first port number or numbers, the opened second port number or numbers, or the opened first and second port numbers. In some embodiments, updated first configuration data 602 may be generated based on new rule 604 and updated second configuration data 606 may be generated based on new rule 608. New rule 604 may specify that destination IP address "1.2.4" is open on port number "2," and therefore application "App. Y" is able to communicate over port number "2" for both first firewall 140-1 and second firewall 140-2. New rule 608 may specify that destination IP address "2.4.3" is open on port number "3," and therefore application "App. X" is able to communicate over port number "3." In some embodiments, operation 738 may be performed by a subsystem that is the same or similar to configuration data update subsystem 112.

Figure 8:
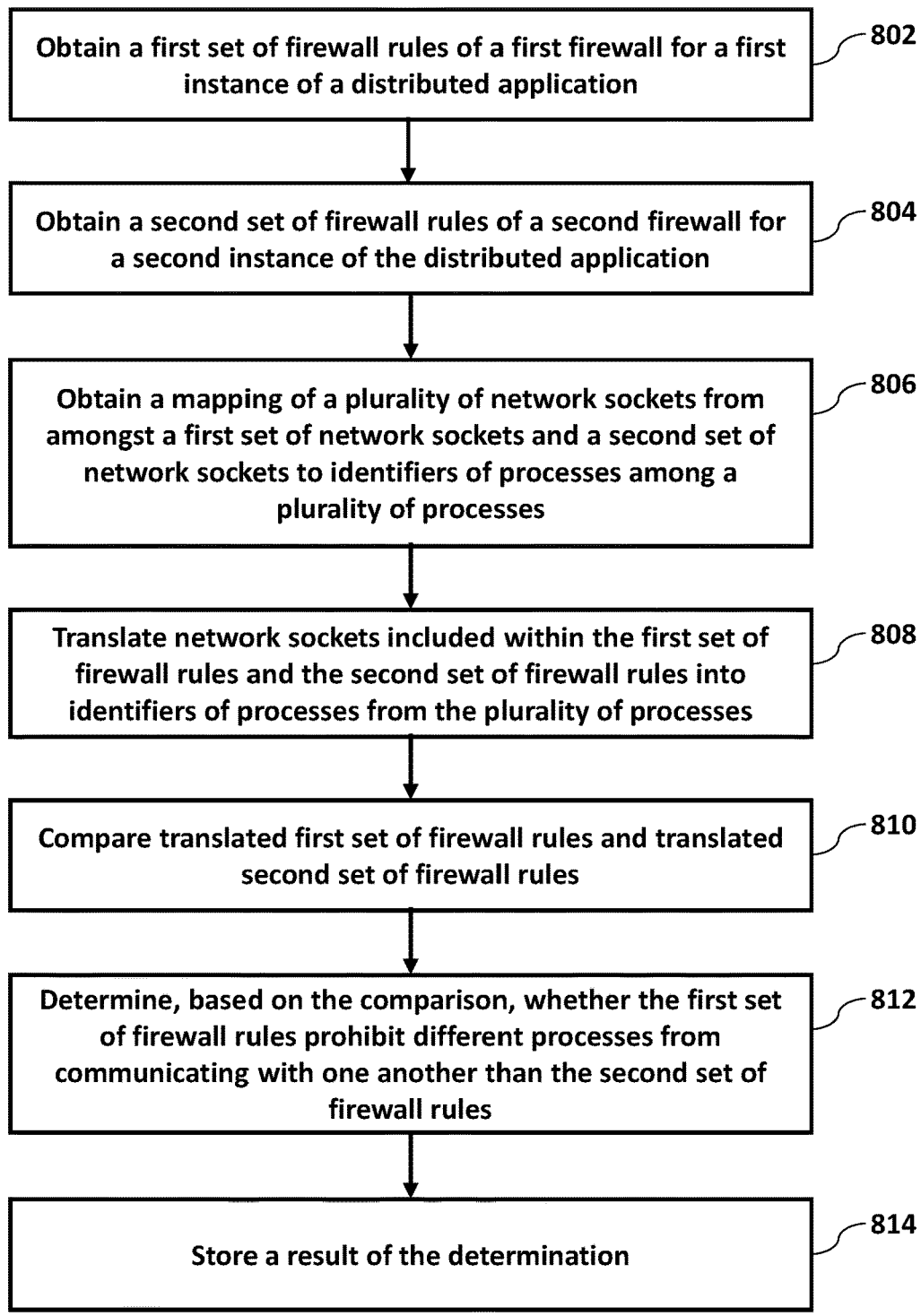
FIG. 8 illustrates an example process for detecting firewall drift, in accordance with various embodiments.

FIG. 8 illustrates an example process for detecting firewall drift, in accordance with various embodiments. In some embodiments, process 800 may begin at operation 802. In operation 802, a first set of firewall rules of a first firewall for a first instance of a distributed application may be obtained. The first set of firewall rules may specify whether respective pairs of network sockets of a first set of network sockets are authorized to communicate with one another via network traffic. The first instance of the distributed application may include a first set of instances of processes executing on a first plurality of computers. For example, the first set of instances of processes may execute on some or all of client devices 240 of first cluster 120-1. Some cases include a process of a distributed application being performed by client devices 240. Each network socket of the first set of network sockets may include an IP address and a port number of a port specifying one of the first set of instances of the processes associated with the network traffic. For example, the pair of network sockets may define a source IP address and a destination IP address, and a port number of a port over which data packets sent from the source IP address may be communicated to the destination IP address. In some embodiments, operation 802 may be performed by a subsystem that is the same or similar to rule extraction subsystem 104.

In operation 804, a second set of firewall rules of a second firewall for a second instance of a distributed application may be obtained. The second set of firewall rules may specify whether respective pairs of network sockets of a second set of network sockets are authorized to communicate with one another via network traffic. The second instance of the distributed application may include a second set of instances of processes executing on a second plurality of computers. For example, the second set of instances of processes may execute on some or all of clients 242 of second cluster 120-2. Some cases include a process of a distributed application being performed by client devices 242. Each network socket of the second set of network sockets may include an IP address and a port number of a port specifying one of the second set of instances of the processes associated with the network traffic. For example, the pair of network sockets may define a source IP address and a destination IP address, and a port number of a port over which data packets sent from the source IP address may be communicated to the destination IP address. In some embodiments, operation 804 may be performed by a subsystem that is the same or similar to rule extraction subsystem 104.

In operation 806, a mapping of a plurality of network sockets from amongst the first set of network sockets and the second set of network sockets to identifiers of processes among the plurality of processes may be obtained. The mapping may indicate which processes have respective instances from amongst the first and second sets of instances bound to which network sockets of the plurality of network sockets. As an example, reference data 300 may represent a mapping of network sockets from the first set of network sockets and the second set of network sockets to identifiers of processes from amongst a plurality of processes executing on the computers of first cluster 120-1 and the computers of second cluster 120-2. For example, one or more services of an instance of application "App X" may be hosted by or accessible by IP address 1.2.3 and 2.3.4. In some cases, reference data 300 may also include protocols authorized for each pair of network sockets. In some embodiments, operation 806 may be performed by a subsystem that is the same or similar to reference data subsystem 106.

In operation 808, network sockets included within the first set of firewall rules and the second set of firewall rules may be translated into identifiers of processes from the plurality of processes executed by the computers of the first cluster and the computers of the second cluster. The translation may be based on the first set of firewall rules, the second set of firewall rules, and the mapping. In some embodiments, the translation may produce a translated first set of firewall rules and a translated second set of firewall rules, where each translated firewall rule associates a service or instance of an application to a port number. For example, first information 402 may associate each of applications "App. X" and "App. Y" to a port number (e.g., port numbers 1, 2, 3). In some embodiments, operation 808 may be performed by a subsystem that is the same or similar to mapping subsystem 108.

In operation 810, the translated first set of firewall rules and the translated second set of firewall rules may be compared. The comparison may identify whether services or applications are accessible over certain ports via one firewall but are not accessible over those ports via another firewall. In some embodiments, operation 810 may be performed by a subsystem that is the same or similar to comparison subsystem 110.

In operation 812, a determination may be made, based on the comparison, as to whether the first set of firewall rules prohibit different processes from communicating with one another than the second set of firewall rules. For example, the determination may detect whether application "App. X" is accessible over port number 3 via the first set of firewall rules, but is not accessible over port number 3 via the second set of firewall rules. If so, this may indicate that firewall drift has been detected. In some embodiments, operation 812 may be performed by a subsystem that is the same or similar to comparison subsystem 110.

In operation 814, a result of the determination may be stored in memory. For instance, a result indicating whether any instances of firewall drift have been detected may be stored in memory of computer system 102. The result may be used to determine whether one or more firewalls' configuration data (e.g., firewall rules) need to be updated, whether ports need to be opened for a given firewall, or whether other actions need to occur. In some embodiments, operation 814 may be performed by a subsystem that is the same or similar to comparison subsystem 110, configuration data update subsystem 112, or a combination thereof.

Figure 9:
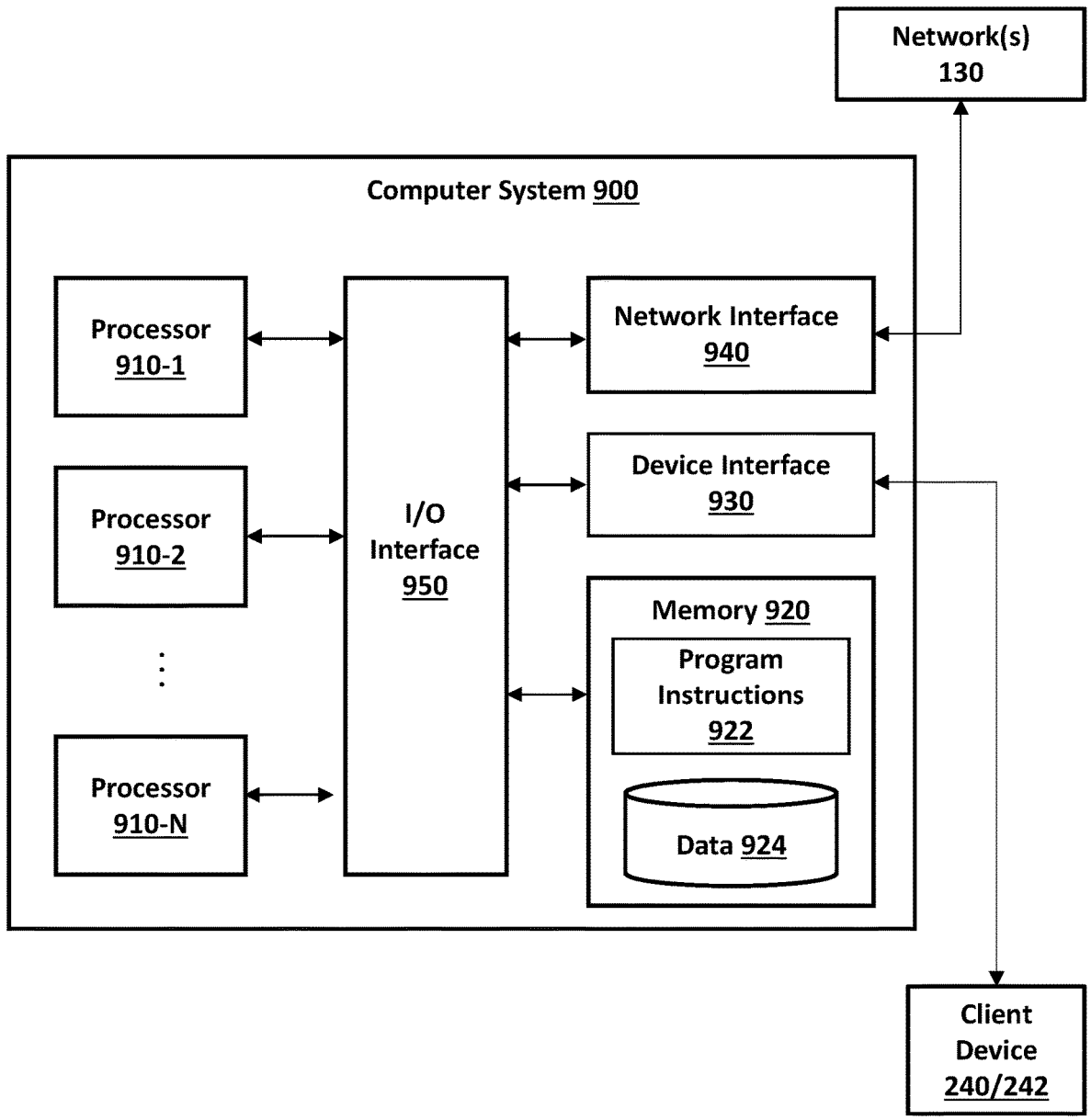
FIG. 9 illustrates an example of a computing system by which one or more of the present techniques may be implemented, in accordance with various embodiments.

FIG. 9 is a diagram that illustrates an exemplary computing system 900 in accordance with embodiments of the present technique. Various portions of systems and methods described herein, may include or be executed on one or more computer systems similar to computing system 900. Further, processes and modules described herein may be executed by one or more processing systems similar to that of computing system 900. In some embodiments, computer system 102, client device 240, 242, or other components of system 100 may include some or all of the components and features of computing system 900.

Computing system 900 may include one or more processors (e.g., processors 910-1-910-N) coupled to system memory 920, an input/output I/O device interface 930, and a network interface 940 via an input/output (I/O) interface 950. A processor may include a single processor or a plurality of processors (e.g., distributed processors). A processor may be any suitable processor capable of executing or otherwise performing one or more instructions. A processor may include a central processing unit (CPU) that carries out program instructions to perform the arithmetical, logical, and input/output operations of computing system 900. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 920). Computing system 900 may be a uni-processor system including one processor (e.g., processor 910-1), or a multi-processor system including any number of suitable processors (e.g., 910-1-910-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 900 may include a plurality of computing devices (e.g., distributed computer systems) to implement various processing functions.

I/O device interface 930 may provide an interface for connection of one or more I/O devices, such as client devices 240, 242 to computing system 900. I/O devices may include devices that receive input (e.g., from a user) or output information (e.g., to a user). I/O devices, like client devices 240, 242, may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices may be connected to computing system 900 through a wired or wireless connection. I/O devices may be connected to computing system 900 from a remote location. I/O devices located on remote computer system, for example, may be connected to computing system 900 via a network and network interface 940.

Network interface 940 may include a network adapter that provides for connection of computing system 900 to a network. Network interface 940 may facilitate data exchange between computing system 900 and other devices connected to the network. Network interface 940 may support wired or wireless communication. The network may include an electronic communication network, such as the Internet, a local area network (LAN), a wide area network (WAN), a cellular communications network, or the like.

System memory 920 may be configured to store program instructions 922 or data 924. Program instructions 922 may be executable by a processor (e.g., one or more of processors 910-1-910-N) to implement one or more embodiments of the present techniques. Program instructions 922 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 920 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 920 may include a non-transitory computer readable storage medium that may have program instructions stored thereon that are executable by a computer processor (e.g., one or more of processors 910-1-910-N) to cause the subject matter and the functional operations described herein. A memory (e.g., system memory 920) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 950 may be configured to coordinate I/O traffic between processors 910-1-910-N, system memory 920, network interface 940, I/O devices 960, and/or other peripheral devices. I/O interface 950 may perform protocol, timing, or other data transformations to convert data signals from one component (e.g., system memory 920) into a format suitable for use by another component (e.g., processors 910-1-910-N). I/O interface 950 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 900 or multiple computing systems 900 configured to host different portions or instances of embodiments. Multiple computing systems 900 may provide for parallel or sequential processing/execution of one or more portions of the techniques described herein.

Those skilled in the art will appreciate that computing system 900 is merely illustrative and is not intended to limit the scope of the techniques described herein. Computing system 900 may include any combination of devices or software that may perform or otherwise provide for the performance of the techniques described herein. For example, computing system 900 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a wearable device, or a Global Positioning System (GPS), or the like. Computing system 900 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 900 may be transmitted to computing system 900 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used herein, the terms "generate," "generating," and "generated" do not require that an object or objects be created "at that moment," and can include instances of the object or objects having been previously created, stored, and then retrieved. These terms also do not preclude retrieving a previously stored value from a list of candidates.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

A1. A method, comprising: obtaining, with the computing system, a first set of firewall rules of a first firewall for a first instance of a distributed application, wherein a first set of services of a plurality of services of the first instance of the distributed application are executed on a first plurality of computers, wherein each firewall rule of the first set of firewall rules comprises a respective IP address and a respective port number of a respective port over which network traffic directed to a respective service at the respective IP address and the respective port number is to be communicated; obtaining, with the computing system, a second set of firewall rules of a second firewall for a second instance of the distributed application, wherein a second set of services of a plurality of services of the second instance of the distributed application are executed on a second plurality of computers, wherein each firewall rule of the second set of firewall rules comprises a respective IP address and a respective port number of a respective port over which network traffic directed to a respective service at the respective IP address and the respective port number is to be communicated; obtaining, with the computing system, a mapping of IP addresses to identifiers of services from amongst the first set of services and the second set of services; determining, with the computing system, based on the first set of firewall rules and the second set of firewall rules and the mapping, respectively, (i) a first set of IP addresses authorized to communicate with the first set of services and a first set of port numbers of respective first ports over which communications between a respective IP address from the first set of IP addresses and a respective service from the first set of services are transmitted, and (ii) a second set of IP addresses authorized to communicate with the second set of services and a second set of port numbers of respective second ports over which communications between a respective IP address from the second set of IP addresses and a respective service from the second set of services are transmitted; generating, with the computing system, first connectivity data and second connectivity data indicating, for each of the first set of IP addresses and each of the second set of IP addresses, respectively, a respective port number from the first set of port numbers over which communications between a respective IP address from the first set of IP addresses and a respective service from the first set of services are transmitted, and a respective port number from the second set of port numbers over which communications between a respective IP address from the second set of IP addresses and a respective service from the second set of services are transmitted; generating, with the computing system, first comparison data based on a first comparison of the first connectivity data and the second connectivity data, wherein the first comparison data indicates whether firewall drift is detected for at least one of the first set of firewall rules or the second set of firewall rules.

A2. The method of embodiment A1, wherein the first comparison data indicates that firewall drift is detected based on: (i) a determination that a first service of the plurality of services of the first instance of the distributed application is permitted to communicate over a port corresponding to one of the first set of port numbers and is not permitted to communicate over any ports associated with the second set of port numbers, or (ii) a determination that a second service of the plurality of services of the second instance of the distributed application is permitted to communicate over a port corresponding to one of the second set of port numbers and is not permitted to communicate over any ports associated with the first set of port numbers.

A3. The method of any one of embodiments A1-A2, wherein: each rule of the first set of firewall rules comprises: a first source IP address authorized to communicate with the first plurality of computers to access the plurality of services of the first instance of the distributed application; a first destination IP address authorized to receive communications from the first source IP address; and a first port number of the first set of port numbers with over which the first source IP address and the first destination IP address communicate; and each rule of the second set of firewall rules comprises: a second source IP address authorized to communicate with the second plurality of computers to access the plurality of services of the second instance of the distributed application; a second destination IP address authorized to receive communications from the second source IP address; and a second port number of the second set of port numbers with over which the second source IP address and second destination IP address communicate.

A4. The method of any one of embodiments A1-A3, wherein a computing network comprises the first plurality of computers, the second plurality of computers, and a third plurality of computers.

A5. The method of embodiment A4, further comprising: obtaining, with the computing system, a third set of firewall rules of a third firewall for a third instance of the distributed application, wherein a third set of services of the plurality of services of the third instance of the distributed application are executed on the third plurality of computers, wherein each firewall rule of the third set of firewall rules comprises a respective IP address and a respective port number of a third port over which network traffic directed to a respective service at the respective IP address and the respective port number is to be communicated; obtaining, with the computing system, a mapping of IP addresses to identifiers of services from amongst the first set of services, the second set of services, and the third set of services; determining, with the computing system, based on the first set of firewall rules and the third set of firewall rules and the mapping, respectively, (i) a third set of IP addresses authorized to communicate with the first set of services and a third set of port numbers of respective third ports over which communications between a respective IP address from the third set of IP addresses and a respective service from the first set of services are transmitted, and (ii) a fourth set of IP addresses authorized to communicate with the third set of services and a fourth set of port numbers of respective fourth ports over which communications between a respective IP address from the fourth set of IP addresses and a respective service from the third set of services are transmitted; generating, with the computing system, third connectivity data indicating, for each of the third set of IP addresses and each of the fourth set of IP addresses, respectively, a respective port number from the third set of port numbers over which communications between a respective IP address from the third set of IP addresses and a respective service from the first set of services are transmitted, and a respective port number from the fourth set of port numbers over which communications between a respective IP address from the fourth set of IP addresses and a respective service from the third set of services are transmitted; and generating, with the computing system, second comparison data based on a comparison of the first connectivity data and the third connectivity data, wherein the second comparison data indicates whether firewall drift is detected for the third set of firewall rules.

A6. The method of embodiment A5, wherein firewall drift being detected in the at least one of the first set of firewall rules, the second set of firewall rules, or the third set of firewall rules is based on at least one of: (i) a determination that a first service of the plurality of services is authorized to communicate over a port corresponding to one of the first set of port numbers and is not authorized to communicate over a port associated with any of the second set of port numbers, (ii) a determination that a second service of the plurality of services is authorized to communicate over a port corresponding to one of the second set of port numbers and is not authorized to communicate over a port associated with any of the first set of port numbers, (iii) a determination that a third service of the plurality of services is authorized to communicate over a port corresponding to one of the first set of port numbers and is not authorized to communicate over a port associated with any of the third set of port numbers, (iv) a determination that a fourth service of the plurality of services is authorized to communicate over a port corresponding to one of the third set of port numbers and is not authorized to communicate over a port associated with any of the first set of port numbers, (v) a determination that a fifth service of the plurality of services is authorized to communicate over a port corresponding to one of the second set of port numbers and is not authorized to communicate over a port associated with any of the third set of port numbers, or (vi) a determination that a sixth service of the plurality of services is authorized to communicate over a port corresponding to one of the third set of port numbers and is not authorized to communicate over a port associated with any of the second set of port numbers.

A7. The method of any one of embodiments A1-A6, wherein the operations further comprise: detecting, with the computing system, firewall drift in the first set of firewall rules, the second set of firewall rules, or the first set of firewall rules and the second set of firewall rules; generating, with the computing system, a new firewall rule to update the first set of firewall rules, the second set of firewall rules, or the first set of firewall rules and the second set of firewall rules, wherein the new firewall rule comprises (i) a port number and (ii) an IP address over which network traffic directed to a service at the IP address and the port number is to be communicated; and updating, with the computing system, the first set of firewall rules, the second set of firewall rules, or the first set of firewall rules and the second set of firewall rules based on the new firewall rule to obtain an updated first set of firewall rules, an updated second set of firewall rules, or the updated first set of firewall rules and the updated second set of firewall rules, wherein the updated first set of firewall rules, the updated second set of firewall rules, or the updated first set of firewall rules and the updated second set of firewall rules comprises the first set of firewall rules and the new firewall rule.

A8. The method of any one of embodiments A1-A7, further comprising: generating, with the computing system, the mapping based on: a first list of IP address extracted from the first set of firewall rules and a second list of IP addresses extracted from the second set of firewall rules, and an indication of each IP address with which one or more of the plurality of services communicates.

A9. The method of any one of embodiments A1-A8, further comprising: generating, with the computing system, the mapping in response to receiving an HTTP request directed to a first computer of the first plurality of computers from a second computer of the second plurality of computers, wherein the first set of firewall rules are obtained based on the HTTP request being directed to the first computer of the first plurality of computers and the second set of firewall rules are obtained based on the HTTP request being from the second computer of the second plurality of computers.

A10. The method of any one of embodiments A1-A9, wherein responsive to determining that a first service of the plurality of services of the first instance of the distributed application is permitted to communicate over a port corresponding to one of the first set of port numbers and is not permitted to communicate over any ports associated with the second set of port numbers, the operations further comprise: causing the port corresponding to one of the first set of port numbers to be opened at the second firewall such that the second set of port numbers is updated to include the port.

A11. The method of any one of embodiments A1-A10, wherein responsive to determining that a second service of the plurality of services of the second instance of the distributed application is permitted to communicate over a port corresponding to one of the second set of port numbers and is not permitted to communicate over any ports associated with the first set of port numbers, the operations further comprise: causing the port corresponding to one of the second set of port numbers to be opened at the first firewall such that the first set of port numbers is updated to include the port.

A12. The method of any one of embodiments A1-A11, further comprising: steps for repeating the first comparison periodically.

A13. The method of any one of embodiments A1-A12, further comprising: steps for generating the first set of firewall rules; and steps for generating the second set of firewall rules.

B1. A method, comprising: obtaining, with a computing system, a first set of firewall rules of a first firewall for a first instance of a distributed application, the first set of firewall rules specifying whether respective pairs of network sockets of a first set of network sockets are authorized to communicate with one another via network traffic, the first instance of the distributed application comprising a first set of instances of a plurality of processes executing on a first plurality of computers, and wherein each network socket of the first set of network sockets comprises an IP address and a port number of a port specifying one of the first set of instances associated with the network traffic; obtaining, with the computer system, a second set of firewall rules of a second firewall for a second instance of the distributed application, the second set of firewall rules specifying whether respective pairs of network sockets of a second set of network sockets are authorized to communicate with one another via network traffic, the second instance of the distributed application comprising a second set of instances of the plurality of processes executing on a second plurality of computers, and wherein each network socket of the second set of network sockets comprises an IP address and a port number of a port number of a port specifying one of the second set of instances associated with the network traffic; obtaining, with the computer system, a mapping of a plurality of network sockets from amongst the first set of network sockets and the second set of network sockets to identifiers of processes among the plurality of processes, the mapping indicating which processes of the plurality of processes have respective instances from amongst the first set of instances and the second set of instances bound to which network sockets of the plurality of network sockets; determining, with the computer system, based on the mapping, whether the first set of firewall rules prohibit different processes from the plurality of processes from communicating with one another than the second set of firewall rules, the determination comprising: translating network sockets included within the first set of firewall rules and the second set of firewall rules into identifiers of processes from the plurality of processes to obtain a translated first set of rules and a translated second set of rules, and comparing the translated first set of rules and the translated second set of rules; and storing, with the computer system, a result of the determination in memory.

B2. The method of embodiment B1, further comprising: generating, with the computing system, the mapping of the plurality of network sockets to the identifiers of the processes from among the plurality of processes prior to the first set of firewall rules and the second set of firewall rules being obtained.

B3. The method of embodiment B2, wherein generating comprises: scanning, with the computing system, the first firewall to extract a first list of IP addresses that are permitted to send, receive, or send and receive network traffic for one or more of the first plurality of computers; scanning, with the computing system, the second firewall to extract a second list of IP addresses that are permitted to send, receive, or send and receive network traffic for one or more of the second plurality of computers; obtaining, with the computing system, data indicating which instances of the first set of instances and the second set of instances have been accessed by IP addresses included in the first list of IP addresses and the second list of IP addresses; generating, with the computing system, based on the data, a data structure comprising the first list of IP addresses and the second list of IP addresses and a given instance of the first set of instances and the second set of instances linked to a respective IP address from the first list of IP addresses and the second list of IP addresses, wherein the data structure comprises the mapping.

B4. The method of any one of embodiments B1-B3, wherein the mapping is updated in response to a predetermined amount of time elapsing.

B5. The method of any one of embodiments B1-B4, wherein the mapping is updated based on an HTTP request submitted by a first computer from the first plurality of computers or the second plurality of computers.

B6. The method of embodiment B5, further comprising: updating, with the computing system, the mapping of the plurality of network sockets to the identifiers of processes among the plurality of processes, wherein updating comprises: receiving the HTTP request from the first computer; and extracting, from the HTTP request, a source IP address of the first computer, a destination IP address for the HTTP request, and a port number of a port over which data associated with the HTTP request is to be communicated, wherein the destination IP address corresponding to a second computer from the first plurality of computers and the second plurality of computers, the first set of firewall rules being obtained based on the first plurality of computers including the first computer, and the second set of firewall rules being obtained based on the second plurality of computers including the second computer.

B7. The method of any one of embodiments B1-B6, wherein translating network sockets comprises: selecting, with the computing system, a first firewall rule from the first set of firewall rules; extracting, with the computing system, from the first firewall rule, a first source IP address, a first destination IP address, and a first port number; determining, with the computing system, based on the mapping, that at least one instance of the first set of instances of the plurality of processes of the first instance of the distributed application is accessed by at least one of the first source IP address or the first destination IP address; generating, with the computing system, a first translated rule comprising the at least one instance of the first set of instances of the plurality of processes of the first instance of the distributed application and the first port number extracted from the first firewall rule, wherein the selecting, extracting, determining, and generating are repeated for each firewall rule in the first set of firewall rules to obtain the translated first set of rules; selecting, with the computing system, a second firewall rule from the second set of firewall rules; extracting, with the computing system, from the second firewall rule, a second source IP address, a second destination IP address, and a second port number; determining, with the computing system, based on the mapping, that at least one instance of the second set of instances of the plurality of processes of the second instance of the distributed application is accessed by at least one of the second source IP address or the second destination IP address;

and generating, with the computing system, a second translated rule comprising the at least one instance of the second set of instances of the plurality of processes of the second instance of the distributed application and the second port number extracted from the second firewall rule, wherein the selecting, extracting, determining, and generating are repeated for each firewall rule in the second set of firewall rules to obtain the translated second set of rules.

B8. The method of embodiment B7, wherein comparing the translated first set of first rules and the translated second set of firewall rules comprises: determining, with the computing system, based on the translated first set of firewall rules and the translated second set of firewall rules, whether: the at least one instance of the first set of instances of the plurality of processes of the first instance of the distributed application is accessible by an IP address of the second set of network sockets of the second firewall via a first port corresponding to the first port number, or the at least one instance of the second set of instances of the plurality of processes of the second instance of the distributed application is accessible by an IP address of the first set of network sockets of the first firewall via a second port corresponding to the second port number.

B9. The method of any one of embodiments B1-B8, further comprising: causing one or more ports to be opened at the first firewall or the second firewall based on the result of the determination.

B10. The method of any one of embodiments B1-B9, further comprising: steps for repeating the first comparison periodically.

B11. The method of any one of embodiments B1-B10, further comprising: steps for generating the first set of firewall rules; and steps for generating the second set of firewall rules.

C1. A non-transitory computer-readable medium storing computer program instructions that, when executed, effectuation operations comprising the method of any one of embodiments A1-A13 or B1-B11.

D1. A system, comprising: memory storing computer program instructions; and one or more processors configured to execute the computer program instructions to effectuate the method of any one of embodiments A1-A13 or B1-B11.

What is claimed is:

1. A non-transitory computer-readable medium storing computer program instructions that, when executed by a computer system, effectuate operations comprising:
   obtaining, with a computing system, a first set of firewall rules of a first firewall for a first instance of a distributed application, the first set of firewall rules specifying whether respective pairs of network sockets of a first set of network sockets are authorized to communicate with one another via network traffic, the first instance of the distributed application comprising a first set of instances of a plurality of processes executing on a first plurality of computers, and wherein each network socket of the first set of network sockets comprises an IP address and a port number of a port specifying one of the first set of instances associated with the network traffic;
   obtaining, with the computer system, a second set of firewall rules of a second firewall for a second instance of the distributed application, the second set of firewall rules specifying whether respective pairs of network sockets of a second set of network sockets are authorized to communicate with one another via network traffic, the second instance of the distributed application comprising a second set of instances of the plurality of processes executing on a second plurality of computers, and wherein each network socket of the second set of network sockets comprises an IP address and a port number of a port number of a port specifying one of the second set of instances associated with the network traffic;
   obtaining, with the computer system, a mapping of a plurality of network sockets from amongst the first set of network sockets and the second set of network sockets to identifiers of processes among the plurality of processes, the mapping indicating which processes of the plurality of processes have respective instances from amongst the first set of instances and the second set of instances bound to which network sockets of the plurality of network sockets;
   determining, with the computer system, based on the mapping, whether the first set of firewall rules prohibit different processes from the plurality of processes from communicating with one another than the second set of firewall rules, the determination comprising:
      translating network sockets included within the first set of firewall rules and the second set of firewall rules into identifiers of processes from the plurality of processes to obtain a translated first set of rules and a translated second set of rules; and
      comparing the translated first set of rules and the translated second set of rules; and
      using the translated first set of firewall rules or the translated second set of firewall rules to determine whether the first set of firewall rules prohibit different programs from communicating with one another than the second set of firewall rules; and
   storing, with the computer system, a result of the determination in memory.

2. The non-transitory computer-readable medium of claim 1, wherein the operations further comprise:
   generating, with the computing system, the mapping of the plurality of network sockets to the identifiers of the processes from among the plurality of processes prior to the first set of firewall rules and the second set of firewall rules being obtained.

3. The non-transitory computer-readable medium of claim 2, wherein generating comprises:
   scanning, with the computing system, the first firewall to extract a first list of IP addresses that are permitted to send, receive, or send and receive network traffic for one or more of the first plurality of computers;
   scanning, with the computing system, the second firewall to extract a second list of IP addresses that are permitted to send, receive, or send and receive network traffic for one or more of the second plurality of computers;
   obtaining, with the computing system, data indicating which instances of the first set of instances and the second set of instances have been accessed by IP addresses included in the first list of IP addresses and the second list of IP addresses; and
   generating, with the computing system, based on the data, a data structure comprising the first list of IP addresses and the second list of IP addresses and a given instance of the first set of instances and the second set of instances linked to a respective IP address from the first list of IP addresses and the second list of IP addresses, wherein the data structure comprises the mapping.

4. The non-transitory computer-readable medium of claim 1, wherein the mapping is updated in response to a predetermined amount of time elapsing.

5. The non-transitory computer-readable medium of claim 1, wherein the mapping is updated based on an HTTP request submitted by a first computer from the first plurality of computers or the second plurality of computers.

6. The non-transitory computer-readable medium of claim 5, wherein the operations comprise:
updating, with the computing system, the mapping of the plurality of network sockets to the identifiers of processes among the plurality of processes, wherein updating comprises:
receiving the HTTP request from the first computer; and
extracting, from the HTTP request, a source IP address of the first computer, a destination IP address for the HTTP request, and a port number of a port over which data associated with the HTTP request is to be communicated, wherein the destination IP address corresponding to a second computer from the first plurality of computers and the second plurality of computers, the first set of firewall rules being obtained based on the first plurality of computers including the first computer, and the second set of firewall rules being obtained based on the second plurality of computers including the second computer.

7. The non-transitory computer-readable medium of claim 1, wherein translating network sockets comprises:
selecting, with the computing system, a first firewall rule from the first set of firewall rules;
extracting, with the computing system, from the first firewall rule, a first source IP address, a first destination IP address, and a first port number;
determining, with the computing system, based on the mapping, that at least one instance of the first set of instances of the plurality of processes of the first instance of the distributed application is accessed by at least one of the first source IP address or the first destination IP address;
generating, with the computing system, a first translated rule comprising the at least one instance of the first set of instances of the plurality of processes of the first instance of the distributed application and the first port number extracted from the first firewall rule, wherein the selecting, extracting, determining, and generating are repeated for each firewall rule in the first set of firewall rules to obtain the translated first set of rules;
selecting, with the computing system, a second firewall rule from the second set of firewall rules;
extracting, with the computing system, from the second firewall rule, a second source IP address, a second destination IP address, and a second port number;
determining, with the computing system, based on the mapping, that at least one instance of the second set of instances of the plurality of processes of the second instance of the distributed application is accessed by at least one of the second source IP address or the second destination IP address; and
generating, with the computing system, a second translated rule comprising the at least one instance of the second set of instances of the plurality of processes of the second instance of the distributed application and the second port number extracted from the second firewall rule, wherein the selecting, extracting, determining, and generating are repeated for each firewall rule in the second set of firewall rules to obtain the translated second set of rules.

8. The non-transitory computer-readable medium of claim 7, wherein comparing the translated first set of first rules and the translated second set of firewall rules comprises:
determining, with the computing system, based on the translated first set of firewall rules and the translated second set of firewall rules, whether:
the at least one instance of the first set of instances of the plurality of processes of the first instance of the distributed application is accessible by an IP address of the second set of network sockets of the second firewall via a first port corresponding to the first port number, or
the at least one instance of the second set of instances of the plurality of processes of the second instance of the distributed application is accessible by an IP address of the first set of network sockets of the first firewall via a second port corresponding to the second port number.

9. The non-transitory computer-readable medium of claim 1, wherein the operations further comprise:
causing one or more ports to be opened at the first firewall or the second firewall based on the result of the determination.

10. A method comprising:
obtaining, with a computing system, a first set of firewall rules of a first firewall for a first instance of a distributed application, the first set of firewall rules specifying whether respective pairs of network sockets of a first set of network sockets are authorized to communicate with one another via network traffic, the first instance of the distributed application comprising a first set of instances of a plurality of processes executing on a first plurality of computers, and wherein each network socket of the first set of network sockets comprises an IP address and a port number of a port specifying one of the first set of instances associated with the network traffic;
obtaining, with the computer system, a second set of firewall rules of a second firewall for a second instance of the distributed application, the second set of firewall rules specifying whether respective pairs of network sockets of a second set of network sockets are authorized to communicate with one another via network traffic, the second instance of the distributed application comprising a second set of instances of the plurality of processes executing on a second plurality of computers, and wherein each network socket of the second set of network sockets comprises an IP address and a port number of a port number of a port specifying one of the second set of instances associated with the network traffic;
obtaining, with the computer system, a mapping of a plurality of network sockets from amongst the first set of network sockets and the second set of network sockets to identifiers of processes among the plurality of processes, the mapping indicating which processes of the plurality of processes have respective instances from amongst the first set of instances and the second set of instances bound to which network sockets of the plurality of network sockets;
determining, with the computer system, based on the mapping, whether the first set of firewall rules prohibit different processes from the plurality of processes from communicating with one another than the second set of firewall rules, the determination comprising:

translating network sockets included within the first set of firewall rules and the second set of firewall rules into identifiers of processes from the plurality of processes to obtain a translated first set of rules and a translated second set of rules comparing the translated first set of rules and the translated second set of rules; and using the translated first set of firewall rules or the translated second set of firewall rules to determine whether the first set of firewall rules prohibit different programs from communicating with one another than the second set of firewall rules; and storing, with the computer system, a result of the determination in memory.

11. The method of claim 10, further comprising:
generating, with the computing system, the mapping of the plurality of network sockets to the identifiers of the processes from among the plurality of processes prior to the first set of firewall rules and the second set of firewall rules being obtained.

12. The method of claim 11, further comprising:
scanning, with the computing system, the first firewall to extract a first list of IP addresses that are permitted to send, receive, or send and receive network traffic for one or more of the first plurality of computers;

scanning, with the computing system, the second firewall to extract a second list of IP addresses that are permitted to send, receive, or send and receive network traffic for one or more of the second plurality of computers;

obtaining, with the computing system, data indicating which instances of the first set of instances and the second set of instances have been accessed by IP addresses included in the first list of IP addresses and the second list of IP addresses; and generating, with the computing system, based on the data, a data structure comprising the first list of IP addresses and the second list of IP addresses and a given instance of the first set of instances and the second set of instances linked to a respective IP address from the first list of IP addresses and the second list of IP addresses, wherein the data structure comprises the mapping.

13. The method of claim 10, wherein the mapping is updated in response to a predetermined amount of time elapsing.

14. The method of claim 10, wherein the mapping is updated based on an HTTP request submitted by a first computer from the first plurality of computers or the second plurality of computers.

15. The method of claim 14, further comprising:
updating, with the computing system, the mapping of the plurality of network sockets to the identifiers of processes among the plurality of processes, wherein updating comprises:
receiving the HTTP request from the first computer; and
extracting, from the HTTP request, a source IP address of the first computer, a destination IP address for the HTTP request, and a port number of a port over which data associated with the HTTP request is to be communicated, wherein the destination IP address corresponding to a second computer from the first plurality of computers and the second plurality of computers, the first set of firewall rules being obtained based on the first plurality of computers including the first computer, and the second set of firewall rules being obtained based on the second plurality of computers including the second computer.

16. The method of claim 10, wherein translating network sockets comprises:
selecting, with the computing system, a first firewall rule from the first set of firewall rules;
extracting, with the computing system, from the first firewall rule, a first source IP address, a first destination IP address, and a first port number;
determining, with the computing system, based on the mapping, that at least one instance of the first set of instances of the plurality of processes of the first instance of the distributed application is accessed by at least one of the first source IP address or the first destination IP address;
generating, with the computing system, a first translated rule comprising the at least one instance of the first set of instances of the plurality of processes of the first instance of the distributed application and the first port number extracted from the first firewall rule, wherein the selecting, extracting, determining, and generating are repeated for each firewall rule in the first set of firewall rules to obtain the translated first set of rules;
selecting, with the computing system, a second firewall rule from the second set of firewall rules;
extracting, with the computing system, from the second firewall rule, a second source IP address, a second destination IP address, and a second port number;
determining, with the computing system, based on the mapping, that at least one instance of the second set of instances of the plurality of processes of the second instance of the distributed application is accessed by at least one of the second source IP address or the second destination IP address; and
generating, with the computing system, a second translated rule comprising the at least one instance of the second set of instances of the plurality of processes of the second instance of the distributed application and the second port number extracted from the second firewall rule, wherein the selecting, extracting, determining, and generating are repeated for each firewall rule in the second set of firewall rules to obtain the translated second set of rules.

17. The method of claim 16, wherein comparing the translated first set of first rules and the translated second set of firewall rules comprises:
determining, with the computing system, based on the translated first set of firewall rules and the translated second set of firewall rules, whether:
the at least one instance of the first set of instances of the plurality of processes of the first instance of the distributed application is accessible by an IP address of the second set of network sockets of the second firewall via a first port corresponding to the first port number, or
the at least one instance of the second set of instances of the plurality of processes of the second instance of the distributed application is accessible by an IP address of the first set of network sockets of the first firewall via a second port corresponding to the second port number.

18. The method of claim 10, further comprising:
causing one or more ports to be opened at the first firewall or the second firewall based on the result of the determination.

19. A system, comprising:

memory storing computer program instructions; and one or more processors configured to execute the computer program instructions, which, when executed, cause the one or more processors to:

obtain a first set of firewall rules of a first firewall for a first instance of a distributed application, the first set of firewall rules specifying whether respective pairs of network sockets of a first set of network sockets are permitted to communicate with one another via network traffic, the first instance of the distributed application comprising a first set of instances of a plurality of programs executing on a first plurality of computers and bound to respective network sockets in the first set, and wherein each network socket of the first set of network sockets comprises an IP address and a port number of a port specifying one of the first set of instances associated with the network traffic;

obtain a second set of firewall rules of a second firewall for a second instance of the distributed application, the second set of firewall rules specifying whether respective pairs of network sockets of a second set of network sockets are permitted to communicate with one another via network traffic, the second instance of the distributed application comprising a second set of instances of the plurality of programs executing on a second plurality of computers and bound to respective network sockets in the second set, and wherein each network socket of the second set of network sockets comprises an IP address and a port number of a port number of a port specifying one of the second set of instances associated with the network traffic;

obtain a mapping of network sockets in the first and second sets to identifiers of programs among the plurality of programs, the mapping indicating which programs have respective instances bound to which network sockets;

determine, based on the mapping, whether the first set of firewall rules prohibit different programs from communicating with one another than the second set of firewall rules, wherein, when determining, the one or more processors are configured to:

translate, based on the mapping, network sockets included within the first set of firewall rules or the second set of firewall rules into identifiers of programs from the plurality of programs to obtain a translated first set of firewall rules or a translated second set of firewall rules;

compare the translated first set of rules and the translated second set of rules; and use the translated first set of firewall rules or the translated second set of firewall rules to determine whether the first set of firewall rules prohibit different programs from communicating with one another than the second set of firewall rules; and store a result of the determination in memory.

20. The system of claim 19, wherein the one or more processors are further configured to:

generate the mapping of the plurality of network sockets to the identifiers of the processes from among the plurality of processes prior to the first set of firewall rules and the second set of firewall rules being obtained; wherein, when generating the mapping, the one or more processors are configured to:

scan the first firewall to extract a first list of IP addresses that are permitted to send, receive, or send and receive network traffic for one or more of the first plurality of computers;

scan the second firewall to extract a second list of IP addresses that are permitted to send, receive, or send and receive network traffic for one or more of the second plurality of computers;

obtain data indicating which instances of the first set of instances and the second set of instances have been accessed by IP addresses included in the first list of IP addresses and the second list of IP addresses; and generate, based on the data, a data structure comprising the first list of IP addresses and the second list of IP addresses and a given instance of the first set of instances and the second set of instances linked to a respective IP address from the first list of IP addresses and the second list of IP addresses, wherein the data structure comprises the mapping.

* * * * *